US009352513B2

(12) United States Patent
Sivaniah et al.

(10) Patent No.: US 9,352,513 B2
(45) Date of Patent: May 31, 2016

(54) NANOPOROUS MATERIALS, MANUFACTURE OF NANOPOROUS MATERIALS AND APPLICATIONS OF NANOPOROUS MATERIALS

(75) Inventors: Easan Sivaniah, Cambridge (GB); Paul Zavala Rivera, Cambridge (GB); Vincent N'Guyen, Cambridge (GB)

(73) Assignee: Cambridge Enterprise Limited (GB)

( * ) Notice: Subject to any disclaimer, the term of this patent is extended or adjusted under 35 U.S.C. 154(b) by 501 days.

(21) Appl. No.: 13/823,200

(22) PCT Filed: Sep. 9, 2011

(86) PCT No.: PCT/GB2011/001324
§ 371 (c)(1),
(2), (4) Date: Mar. 14, 2013

(87) PCT Pub. No.: WO2012/035292
PCT Pub. Date: Mar. 22, 2012

(65) Prior Publication Data
US 2013/0180920 A1    Jul. 18, 2013

(30) Foreign Application Priority Data

Sep. 17, 2010 (GB) .................................. 1015673.5
Dec. 2, 2010 (GB) .................................. 1020466.7

(51) Int. Cl.
B29C 65/00    (2006.01)
B28B 1/48    (2006.01)
(Continued)

(52) U.S. Cl.
CPC ............ *B29C 67/202* (2013.01); *B01D 67/003* (2013.01); *B01D 69/02* (2013.01);
(Continued)

(58) Field of Classification Search
CPC .. B01D 71/80; B01D 67/003; B01D 2325/02; B01D 2239/1216; B32B 3/26; C08J 2201/026; C08J 2205/042; C08J 9/26; H01G 11/24; A61L 2400/08; B29C 67/202
See application file for complete search history.

(56) References Cited

U.S. PATENT DOCUMENTS 4,136,025 A * 1/1979 Zwack .................... B01D 61/20
                                        134/34
5,759,489 A * 6/1998 Miura ......................... A61L 2/18
                                        134/22.11

(Continued)

FOREIGN PATENT DOCUMENTS

EP         1063004        12/2000
JP      2003-129288        5/2003

(Continued)

OTHER PUBLICATIONS

Butler, M.F, Donald, A. M, "Deformation of spherulitic polyethylene thin films", Journal of Materials Science, vol. 32, Issue 14, pp. 3675-3685, 1997.

(Continued)

*Primary Examiner* — Ana Fortuna
(74) *Attorney, Agent, or Firm* — Swanson & Bratschun, L.L.C.

(57) ABSTRACT

A nanoporous material is disclosed having a plurality of lamellae. Through each lamella is an array of penetrating pores. Adjacent lamellae are spaced apart by an intervening spacing layer. The spacing layer comprises an array of spacing elements integrally formed with and extending between the adjacent lamellae. The spacing layer has interconnected porosity extending within the spacing layer. Such a nanoporous material can be manufactured using block copolymer materials. First, a morphology is formed comprising a three dimensional array of isolated islands in a continuous matrix. The islands are formed of at least one island component of the block copolymer and the matrix is formed of at least one matrix component of the block copolymer. Next, channels are formed in the matrix between at least some of the islands. The island component is then selectively removed to leave the matrix with an array of interconnected pores.

21 Claims, 23 Drawing Sheets

(51) Int. Cl.

| | |
|---|---|
| B28B 7/00 | (2006.01) |
| B01D 29/00 | (2006.01) |
| B29C 67/20 | (2006.01) |
| B01D 67/00 | (2006.01) |
| B01D 69/02 | (2006.01) |
| B01D 71/28 | (2006.01) |
| B01D 71/80 | (2006.01) |
| C08J 5/22 | (2006.01) |
| C08J 9/26 | (2006.01) |
| C08J 9/40 | (2006.01) |
| H01G 11/26 | (2013.01) |
| H01G 11/36 | (2013.01) |
| H01G 11/46 | (2013.01) |
| H01G 11/50 | (2013.01) |
| H01G 11/86 | (2013.01) |
| B32B 3/26 | (2006.01) |
| B32B 7/02 | (2006.01) |
| H01G 9/00 | (2006.01) |
| H01G 11/24 | (2013.01) |
| H01G 11/48 | (2013.01) |

(52) U.S. Cl.
CPC .............. *B01D 71/28* (2013.01); *B01D 71/80* (2013.01); *B32B 3/26* (2013.01); *B32B 7/02* (2013.01); *C08J 5/2231* (2013.01); *C08J 9/26* (2013.01); *C08J 9/40* (2013.01); *H01G 9/0032* (2013.01); *H01G 11/24* (2013.01); *H01G 11/26* (2013.01); *H01G 11/36* (2013.01); *H01G 11/46* (2013.01); *H01G 11/48* (2013.01); *H01G 11/50* (2013.01); *H01G 11/86* (2013.01); *B01D 2323/30* (2013.01); *B01D 2323/345* (2013.01); *B01D 2325/02* (2013.01); *C08J 2201/026* (2013.01); *C08J 2201/038* (2013.01); *C08J 2201/046* (2013.01); *C08J 2205/042* (2013.01); *C08J 2353/00* (2013.01); *Y02E 60/13* (2013.01); *Y10T 428/24975* (2015.01); *Y10T 428/249981* (2015.04)

(56) References Cited

U.S. PATENT DOCUMENTS

| | | | |
|---|---|---|---|
| 5,948,470 | A | 9/1999 | Harrison et al. |
| 6,565,763 | B1 * | 5/2003 | Asakawa ............... B82Y 10/00 216/22 |
| 6,671,071 | B1 | 12/2003 | Kletter |
| 6,671,097 | B2 | 12/2003 | Fink et al. |
| 2003/0185741 | A1 | 10/2003 | Matyjaszewski et al. |
| 2003/0222048 | A1 | 12/2003 | Asakawa |
| 2006/0171985 | A1 | 8/2006 | Richard et al. |
| 2006/0240240 | A1 | 10/2006 | Cha et al. |
| 2010/0055307 | A1 | 3/2010 | Cha et al. |
| 2013/0180920 | A1 * | 7/2013 | Sivaniah ............... B01D 67/003 210/650 |

FOREIGN PATENT DOCUMENTS

| | | |
|---|---|---|
| JP | 2008-297467 | 12/2008 |
| JP | 2010-214328 | 9/2010 |
| KR | 10-2009-0081532 | 7/2009 |
| WO | WO 00/02090 | 1/2000 |
| WO | WO 2009/048663 | 4/2009 |

OTHER PUBLICATIONS

Crossland E., Marleen Kamperman, Mihaela Nedelcu, Caterina Ducati, Ulrich Wiesner, Detlef-M. Smilgies, Gilman E. S. Toombes, Marc A. Hillmyer, Sabine Ludwigs, Ullrich Steiner, and Henry J. Snaith "A Bicontinuous Double Gyroid Hybrid Solar Cell" Nano Lett., vol. 9, No. 8, 2009, pp. 2807-2812.

Crossland, E., Ludwigs, S., Hillmyer, M.A., Steiner, U. 2010, "Soft Matter" 6(3), pp. 670-676.

Hillmyer M. "Nanoporous Materials from Block Copolymer Precursors" Adv Polym Sci (2005) 190: 137-181.

Lee J-S, Hirao A, Nakahama S "Polymerization of monomers containing functional silyl groups. 7. Porous membranes with controlled microstructures" (1989) Macromolecules 22:2602.

Li X., Charles-Andre Fustin, Nathalie Lefevre, Jean-Francois Gohy, Steven De Feyter, Jeremie De Baerdemaeker, Werner Eggere and Ivo F. J. Vankelecom "Ordered nanoporous membranes based on diblock copolymers with high chemical stability and tunable separation properties" J. Mater. Chem., 2010, 20, 4333-4339.

Liu G et al: "Diblock Thin Films with Densely Haxagonally Packed Nanochannels", Advanced Materials, Wiley VCH Verlag, DE, vol. 10, No. 1, Jan. 2, 1998, pp. 69-71, XP000727826.

Magbitang, T; Lee V.Y, Cha, J.N., "Oriented nanoporous lamellar organosilicates template from topologically unsymmetrial dendritic-linear block copolymers", Angewandte Chemie, vol. 44, Issue 46, pp. 7574-580, 2005.

Ndoni et al. 2003 (UKIPO search report dated Jan. 13, 2011).

Peinemann K. V., V. Abetz, P. F. W. Simon "Asymmetric superstructure formed in a block copolymer via phase separation" Nature Materials vol. 6 Dec. 2007. pp. 992-996.

Simon P. and Y Gogotsi "Materials for Electrochemical Capacitors" Nature Materials vol. 7 Nov. 2008 p. 845.

UKIPO search report dated Jan. 13, 2011, 8 pages.

UKIPO search report dated Jul. 13, 2011, 6 pages.

Xu et al: "Block copolymers surface reconstructions: A reversible route to nanoporous films", Mar. 1, 2003, pp. 698-702, XP55030340.

Xue T., Xu Cai-Ling, Zhao Dan-Dan. Li Xiao-Hing and Li Hu-Lin "Elelctrodeposition of mesoporous manganese dioxide supercapacitor electrodes through self-assembled triblock copolymer templates" Journal of Power Sources 164 (2007) 953-958.

\* cited by examiner

NANOPOROUS MATERIALS, MANUFACTURE OF NANOPOROUS MATERIALS AND APPLICATIONS OF NANOPOROUS MATERIALS

RELATED APPLICATION DATA

This application is a national phase entry pursuant to 35 USC §371 of International Patent Application No. PCT/GB2011/001324, filed Sep. 9, 2011; which application claims priority to and benefit of GB Application No. 1020466.7, filed Dec. 2, 2010, and GB Application No. 1015673.5, filed Sep. 17, 2010. All of the foregoing applications are incorporated herein by reference in their entireties.

BACKGROUND TO THE INVENTION

1. Field of the Invention

The present invention relates to nanoporous materials, methods for the manufacture of nanoporous materials and applications of nanoporous materials. Such materials have utility particularly, but not exclusively, in separation technology, e.g. in separation membranes and the preparation of high surface area electrodes for energy generation and energy storage (e.g. battery and/or supercapacitor) technology.

2. Related Art

Block copolymers are a class of macromolecules comprising two or more chemically distinct polymer blocks. It is conventional to refer to each polymer block as A, B, C, etc.

Hillmyer (2005) [Marc A. Hillmyer "Nanoporous Materials from Block Copolymer Precursors" Adv Polym Sci (2005) 190: 137-181] sets out a review of the formation of nanoporous materials using block copolymer precursors. Such nanoporous materials are of interest for use as nanolithographic masks, separation membranes, interlayer dielectrics and nanomaterial templates. Many synthetic techniques are known for generating AB diblock, ABA triblock and ABC triblock copolymers.

In, for example, linear AB diblock copolymers, four equilibrium morphologies have been identified: lamellar, cylindrical, bicontinuous gyroid and spherical. The morphology formed depends on factors including the relative volume fraction (or number fraction of monomeric units) of each block, and how unfavourable it is for the distinct blocks to mix.

Hillmyer (2005) reviews work on the preparation of ordered block copolymer materials and the subsequent selective etching of the minority component in order to form nanoporous materials. For example, the formation of a cylindrical morphology, and the subsequent etching of the cylinder-forming phase, results in the formation of nanoscopic channels through a matrix material (the matrix material being the continuous phase which surrounded the cylinder-forming phase).

Hillmyer (2005) points out that since there is a wide range of block copolymer structures available, nanoporous materials with a wide range of tunable properties can be imagined. However, he also points out that there are two key requirements for preparing nanoporous materials from ordered block copolymers: (i) the etchable material must be physically accessible to the solvent, and (ii) the matrix material must be able to support the resultant nanoporous structure. (ii) is typically achieved by cross-linking the matrix material.

Various block copolymer systems are discussed by Hillmyer (2005), including:
PS-PBD: polystyrene-polybutadiene
PS-PI: polystyrene-polyisoprene
PS-PBD: polystyrene-polybutadiene
PS-PEO: polystyrene-poly(ethylene oxide)
PPS-PI-PPS: poly(4-vinylphenyl-dimethyl-2-propoxysilane)-b-polyisoprene-b-poly(4-vinylphenyl-dimethyl-2-propoxysilane)
PtBA-PCEMA: poly(t-butylacrylate)-b-poly(2-cinnamoylethyl methacrylate)
PS-PMMA: polystyrene-b-poly(methyl methacrylate)
PS-PLA: polystyrene-polylactide
PI-PLA: polyisoprene-polylactide
PCHE-PLA: polycyclohexylethylene-polylactide
PαMS-PHOST: poly(α-methyl styrene)-b-poly(4-hydroxy styrene)
PS-PFMA: polystyrene-b-poly(perfluorooctylethyl methacrylate)
PI-PCEMA-PtBA: polyisoprene-b-poly(2-cinnamoylethyl methacrylate)-b-poly(t-butylacrylate)
PS-PVP: polystyrene-b-poly-4-vinylpyridine
P(PMDSS)-PI-P(PMDSS): poly(pentamethyldisilylstyrene)-b-polyisoprene-b-poly(pentamethyldisilylstyrene)
PS-PDMS: polystyrene-polydimethylsiloxane Lee et al (1989) [Lee J-S, Hirao A, Nakahama S "Polymerization of monomers containing functional silyl groups. 7. Porous membranes with controlled microstructures" (1989) Macromolecules 22:2602] report the preparation of porous membranes formed from PPS-PI-PPS. Lamellar, cylindrical and spherical morphologies were obtained. When the PI was degraded and removed, the lamellar and cylindrical morphology membranes had a high degree of open porosity, as measured by adsorption of nitrogen (using the BET (Brunauer-Emmett-Teller) method). For the spherical morphology, although the PI could be degraded and removed, the pores are characterised by Lee et al (1989) as closed, because substantially no nitrogen adsorption was observed.

Hillmyer (2005) also refers to other work on spherical morphology block copolymers, this time in bulk form, in which the spherical phase was removed using an anhydrous HF etch. The material studied was PS-PDMS. The byproducts of the etching procedure are volatile and can be removed by evacuation, but the remaining spherical pores were closed.

It is also known to blend block copolymers with homopolymers, e.g. PS-PI with PS homopolymer. Hillmyer (2005) reviewed work on this material to form a bicontinuous gyroid phase. Such a morphology is of interest because orientation of the morphology is not required in order to form separation membranes.

Peinemann et al (2007) [K. V. Peinemann, V. Abetz, P. F. W. Simon "Asymmetric superstructure formed in a block copolymer via phase separation" Nature Materials Vol. 6 Dec. 2007. pp. 992-996] disclose work on the formation of isoporous membranes using PS-PVP diblock copolymer. PVP is a hydrophilic polymer that dissolves in dimethyl formamide (DMF), lower alcohols and aqueous mineralic acids. PS is a hydrophobic polymer that dissolves in a number of organic solvents such as toluene, tetrahydrofuran (THF) or chloroform. PS-PVP diblock copolymers are strongly segregated and their morphology is controlled by the block ratio. A hexagonally packed array of PCP cylinders can be expected for a volume fraction of PVP in the range 0.12 to 0.31. Peinemann et al (2007) therefore studied PS-PVP with 15 wt % PVP.

Crossland et al (2009) [Edward J. W. Crossland, Marleen Kamperman, Mihaela Nedelcu, Caterina Ducati, Ulrich Wiesner, Detlef-M. Smilgies, Gilman E. S. Toombes, Marc A. Hillmyer, Sabine Ludwigs, Ullrich Steiner, and Henry J. Snaith "A Bicontinuous Double Gyroid Hybrid Solar Cell" Nano Lett., Vol. 9, No. 8, 2009, pp. 2807-2812] disclose the use of a porous structure formed from double gyroid phase morphology diblock copolymer to form a solar cell. $TiO_2$ was deposited in the pores. The remaining matrix material from the diblock copolymer is then removed to leave a freestanding network of $TiO_2$. An organic semiconductor material is then infiltrated into the pores in the $TiO_2$ network to form a bicontinuous heterojunction solar cell architecture.

Li et al (2010) [Xianfeng Li, Charles-Andre Fustin, Nathalie Lefevre, Jean-Francois Gohy, Steven De Feyter, Jeremie De Baerdemaeker, Werner Eggere and Ivo F. J. Vankelecom "Ordered nanoporous membranes based on diblock copolymers with high chemical stability and tunable separation properties" J. Mater. Chem., 2010, 20, 4333-4339] note that it is known to form porous membranes by selective removal of the oriented cylindrical phase from diblock copolymer films. However, their work addresses the problem of subsequently transferring the porous membrane to a porous support for practical use of the membrane in separation techniques. PS-PEO diblock copolymer with added PM (poly(acrylic acid)) is deposited onto a porous ceramic (alumina) support by spin coating, forming a layer over the ceramic support. By careful control of the composition, a cylindrical array of PEO-PAA is formed in the PS matrix. Cross-linking of the diblock copolymer is achieved by UV exposure.

U.S. Pat. No. 5,948,470 discloses the formation of a thin film of PS-PI diblock copolymer in which PI spheres are formed in a PS matrix. The packing of the spheres (at least in bulk samples) is body centred cubic. The PI spheres are removed by ozonolysis and the resultant film used for nanolithography.

SUMMARY OF THE INVENTION

The present inventors have realised that it would be advantageous to provide more flexible techniques for the formation of nanoporous structures using block copolymer materials. The present invention has been devised with this preferred object in mind.

Accordingly, in a first aspect, the present invention provides a method of manufacturing a nanoporous material including the steps:
forming a morphology comprising a three dimensional array of isolated islands in a continuous matrix, wherein the islands are formed of at least one island component of a block copolymer and the matrix is formed of at least one matrix component of the block copolymer; and
forming channels in the matrix between at least some of the islands and selectively removing the island component to leave the matrix with an array of interconnected pores.

Preferred (or simply optional) features of the invention are set out below. The are applicable either singly or in any combination to any aspect of the invention, unless the context demands otherwise.

Preferably the islands are substantially equi-axed. For example, the maximum aspect ratio of the islands (i.e. the ratio of any two of three orthogonal linear dimensions of the islands) is preferably 2 or less, more preferably 1.5 or less or 1.1 or less. Preferably all of the three orthogonal linear dimensions of the islands meet this limitation, when divided by either of the other two orthogonal linear dimensions. Most preferably, the islands are substantially spherical.

Preferably, the islands have an average diameter (or corresponding linear dimension) of at least 1 nm, more preferably at least 5 nm. Preferably, the islands have an average diameter (or corresponding linear dimension) of at most 100 nm, more preferably at most 50 nm, still more preferably at most 25 nm. The diameter can be measured, for example, using microscopy, such as SEM or TEM. The distribution of island diameters is preferably relatively narrow. For example, the standard deviation of island diameters is preferably at most 10%. More preferably, the standard deviation of island diameters is at most 5%

Preferably, the three dimensional array of islands is a substantially ordered array. For example, the islands may adopt an array based on crystalline packing. Typical packing arrangements may be body centred cubic, face centred cubic or hexagonal close packing. Some degree of mis-order is permissible in the array, e.g. to accommodate point defects, line defects and/or interface (surface) defects. A typical interface defect is the boundary between adjacent domains of different orientation of packing.

Preferably, in the substantially ordered array, there is a regular minimum spacing between adjacent islands. Where the average diameter of the islands is d, preferably the regular minimum spacing between adjacent islands is at least 1.5 d, more preferably at least 2 d. Preferably the regular minimum spacing between adjacent islands is at most 5 d, more preferably at most 4 d. These ranges are preferred in order to balance the need to produce interconnected porosity and to have a relatively strong matrix that can support the structure when the islands are removed to form the pores.

It is possible to consider the block copolymer in terms of the number fraction of monomer units in each block of the copolymer. Preferably, the number fraction of monomer units in the island component of the block copolymer is at least 5%. It has been found, for some suitable block copolymer systems, that using a fraction lower than this tends to lead to islands that are too far apart in the morphology to lead to adequately interconnected pores. More preferably, the number fraction of monomer units in the island component of the block copolymer is at least 8%.

Preferably, the number fraction of monomer units in the island component of the block copolymer is at most 25%. It has been found, for some suitable block copolymer systems, that using a fraction higher than this tends to lead to the formation of a non-island morphology, e.g. cylindrical, gyroid or lamellar morphology. Such morphologies are not preferred, since the gyroid morphology tends to occur only in a very tight range of compositions, and the cylindrical and lamellar morphologies produce porosity having a specific orientation, meaning that the orientation must be controlled in order to provide porosity of a suitable orientation. More preferably, the number fraction of monomer units in the island component of the block copolymer is at most 20%.

It is possible to add one or more homopolymers to the diblock copolymer, e.g. in order to reach a specific desired composition. This can be useful in order to reduce the overall cost of the starting materials for the composition. The homopolymer additive may be, for example, formed from the same monomer units as is used for the matrix component of the morphology. Additionally or alternatively, the homopolymer may be a material that is miscible in the matrix component. Still further, a homopolymer additive may be formed from the same monomer units as is used for the island component of the morphology. Additionally or alternatively, this homopolymer may be a material that is miscible in the island component.

The inventors have realised that it may be possible to use a number fraction of monomer units in the island component of the block copolymer that is relatively high, e.g. 30% or higher. Such a material would typically form a morphology other than the island morphology. However, by adding one or more homopolymers, it is possible to force the morphology to the island morphology. For example, where the number fraction of monomer units of the island component of the block copolymer that is relatively high, it is possible to add one or more homopolymers that are similar to, or miscible in, the matrix component of the block copolymer. In that case, it is preferred that the sum of the number fraction of monomer units of homopolymer for integration with the matrix and the number fraction of monomer units of matrix component is 75% or higher, more preferably 80% or higher. This approach is advantageous, since careful tailoring of the specific composition of a pure diblock copolymer can be expensive, whereas it is relatively inexpensive to add a homopolymer to a readily available diblock copolymer composition.

Also, the inventors have realised that it may be possible to use a number fraction of monomer units in the island component of the block copolymer that is relatively low, e.g. 10% or lower or even 8% or lower. Such a material would typically form a morphology having islands that are too far apart. However, by adding one or more homopolymers, it is possible to force the morphology to an island morphology having suitable spacing. For example, where the number fraction of monomer units in the island component of the block copolymer is relatively low, it is possible to add one or more homopolymers that are similar to, or miscible in, the island component of the block copolymer. For example, where the number fraction of monomer units of the matrix component of the block copolymer that is relatively high, it is possible to add one or more homopolymers that are similar to, or miscible in, the island component of the block copolymer. In that case, it is preferred that the sum of the number fraction of monomer units of homopolymer for integration with the islands and the number fraction of monomer units of island component is 8% or higher, more preferably 10% or higher.

Preferably, where a homopolymer is added, e.g. for integration with the matrix, the homopolymer has a molecular weight which is no larger than the molecular weight of the matrix component of the copolymer. Furthermore, it is preferred that the homopolymer has a molecular weight which is no smaller than one fifth of the molecular weight of the matrix component of the copolymer. Additionally or alternatively, where a homopolymer is added, e.g. for integration with the islands, the homopolymer has a molecular weight which is no larger than the molecular weight of the island component of the copolymer. Furthermore, it is preferred that the homopolymer has a molecular weight which is no smaller than one fifth of the molecular weight of the island component of the copolymer.

The advantage of these techniques is that the range of suitable starting materials is widened, and thus the cost of producing a required morphology can be reduced. A suitable number fraction (or volume fraction, which is equivalent to number fraction when the densities are equal) of homopolymer can be calculated based on the total number fraction of monomer units including those contributed by the additional homopolymer. As the skilled person easily understands, it is straightforward to deduce how much of homopolymer must be added in order to change the overall fraction of different components in the mixture, this being dependent on the densities of the block copolymer(s) and the homopolymer(s), number of components, etc. Note that the different morphologies may be more precisely represented in a general way using volume (as supposed to weight or number) fractions.

The morphology may be developed by thermal treatment. For example, a suitable thermal treatment may be heating of the material to at least 100° C. More preferably, the material is heated to at least 150° C., or at least 200° C. A particularly suitable temperature is about 230° C. Preferably, the heat treatment is carried out in an inert atmosphere, e.g. under nitrogen.

Preferably, the matrix is treated by cross-linking. Preferably, cross-linking is achieved by irradiation. Suitable irradiation includes electromagnetic irradiation, e.g. using UV radiation. The degree of cross linking of the matrix may vary through the thickness of the matrix. It is speculated that such a variation in cross linking density, which affects the local stiffness of the matrix material, may assist in the development of the preferred nanoporous structure of the material. Cross-linking of the matrix allows the matrix to be substantially self-supporting when the island component is removed.

Preferably, the islands are also subject to the same treatment as causes cross linking of the matrix. However, preferably the islands degrade (rather than cross-link) in response to the cross-linking treatment applied to the matrix. This is beneficial since is provides simultaneous progress towards the product in a single step. Alternatively, the islands may be subjected to a subsequent degradation step after the cross-linking of the matrix. It is preferred that the degradation results in the polymeric chains of the island component being broken into lower molecular weight fragments.

Preferably, the degraded islands are removed using a washing fluid. For example, a solvent of the degraded island material may be used. In the case where the island material comprises PMMA, preferably the washing fluid comprises acetic acid. This washing fluid may also be suitable for other island component compositions.

Preferably, the material is subjected to a gaseous oxidising agent during cross-linking of the matrix. It is considered, without wishing to be bound by theory, that the gaseous oxidising agent can have the effect of degrading at least the island component. It is also considered, again without wishing to be bound by theory, that the gaseous oxidising agent can have the effect of at least partially degrading the matrix component, although it is not preferred. Degradation of the island component makes subsequent removal of the island component more easy. This mode of degradation is also considered to have a significant effect in the development of the morphology of the final, porous structure of the device (discussed in more detail below), although the precise mechanism for this is not clear at the time of writing.

It is considered that a gaseous oxidising agent is preferred, e.g. compared to a liquid (or other non-gaseous fluid) oxidising agent, in order adequately to diffuse through the matrix phase, particularly when the matrix phase is solid (e.g. having been cross-linked already) or is in the process of solidifying.

The gaseous oxidising agent is preferably ozone (i.e. $O_3$). Conveniently, ozone can be formed in situ by action of UV radiation on oxygen, e.g. oxygen in air. UV curing is also a preferred route to achieve cross linking of the matrix phase. Therefore performing the cross linking using UV radiation in an oxygen-containing gas such as air can provide the additional benefits set out above. It is of further benefit to carry out the cross linking in a gas containing a concentration of oxygen higher than the concentration of oxygen in atmospheric air (20.9 vol %). Alternatively, a separate gaseous oxidising agent can be supplied, such as ozone from a different source, or sulphur (e.g. $S_3$), or chlorine or fluorine.

The present inventors have found that the product of the preferred embodiments of the method tends to have a characteristic structure, in the form of alternating layers of relatively high and relative low density, the higher density layers having an array of penetrating pores that communicate with the lower density layers. The inventors realise that such a structure is of interest independently to the process by which it is formed. However, it is expressly mentioned here that the preferred methods according to the first aspect have as their aim the formation of the desired nanoporous material structures defined with respect to the second aspect below.

Thus, preferably the method preferably includes the step of forming a nanoporous material having a plurality of lamellae, each lamella having an array of pores penetrating therethrough. It is preferred that adjacent lamellae are spaced apart by an intervening spacing layer. The spacing layer may comprise an array of spacing elements integrally formed with and extending between the adjacent lamellae. The spacing layer may have interconnected porosity extending within the spacing layer. Thus, the required array of interconnected pores may be provided by this structure. It is considered here that at least some of the channels formed between the islands develop into the pores penetrating through the lamellae.

According to a second preferred aspect, the present invention provides a nanoporous material having a plurality of lamellae, each lamella having an array of pores penetrating therethrough, adjacent lamellae being spaced apart by an intervening spacing layer wherein the spacing layer comprises an array of spacing elements integrally formed with and extending between the adjacent lamellae, the spacing layer having interconnected porosity extending within the spacing layer.

Preferred/optional features of the first and second aspect are set out below. These are combinable singly or in any combination with any aspect of the invention, unless the context demands otherwise.

The porosity of the spacing layer is interconnected typically in the sense that, within the spacing layer, the porosity extends between adjacent spacing elements. This allows each pore of one lamella to have multiple communication paths to a pore of the adjacent lamella and/or to the far side of the adjacent lamella. This is advantageous, since it allows the material to function efficiently as a filter medium for example, in which blockage of one pore in one of the lamellae can be easily bypassed. Therefore the nanoporous material is bicontinuous in the sense that it consists of a matrix material that is bicontinuous with void (interconnected porosity).

Preferably, the degree of porosity of the spacing layer is greater than that of the lamellae. For example, if a notional plane is taken within the plane of a lamella and if a notional plane is taken parallel to this but within the spacing layer, the degree of porosity of each can be estimated by considering the ratio of pore area to the total considered area of the plane. The degree of porosity of the spacing layer on this basis may be at least 1.5 times the degree of porosity of the lamella. More preferably, the degree of porosity of the spacing layer on this basis may be at least 2 times, still more preferably 3 times, 4 times or 5 times the degree of porosity of the lamella. In this consideration, the plane within the spacing layer that provides the maximum degree of porosity may be considered. This is typically located about halfway between adjacent lamellae.

On the same basis as explained in the paragraph above, preferably the degree of porosity of the spacing layer is at least 30%. More preferably, the degree of porosity of the spacing layer is at least 40%, at least 50%, at least 60%, at least 70% or at least 80%. In some embodiments, the degree of porosity can be controlled even after formation of the nanoporous material, as explained in more detail below.

On the same basis as explained in the two paragraphs above, preferably the degree of porosity of the lamella is at least 1%. More preferably, the degree of porosity of the lamella is at least 2%, at least 3%, at least 4%, at least 5%, at least 6%, at least 7%, at least 8%, at least 9%, or at least 10%. The degree of porosity of the lamella may be at most 30%, more preferably at most 25% or at most 20%.

Preferably, the nanoporous material is formed as a film. The nanoporous material may be formed on a substrate, but this is not essential. Preferably, the thickness of the nanoporous material (e.g. the thickness of the film) is at least 40 nm. Where the microstructure is formed due to the formation of isolated islands in a block copolymer, it is considered that this lower limit for the thickness is required in order to provide the required three dimensional array of isolated islands in a continuous matrix. The thickness of the nanoporous material is preferably at least 50 nm, more preferably at least 60 nm, more preferably at least 70 nm, more preferably at least 80 nm, more preferably at least 90 nm, more preferably at least 100 nm, more preferably at least 150 nm, more preferably at least 200 nm, more preferably at least 250 nm, more preferably at least 300 nm.

There is no particular upper limitation on the thickness of the nanoporous material. The lamellae tend to form parallel to the surface of the material. The thickness of the nanoporous material may be limited by the mechanism for cross linking of the matrix component. Where cross linking is carried out using UV irradiation, the depth of penetration of the UV radiation may limit the thickness of the nanoporous material to 10 mm. Such a material may be formed by UV irradiation from both sides. For many applications, the thickness of the nanoporous material may be at most 5 mm, more preferably at most 1 mm, more preferably at most 500 µm, more preferably at most 400 µm, more preferably at most 300 µm, more preferably at most 200 µm, more preferably at most 100 µm, more preferably at most 50 µm, more preferably at most 40 µm, more preferably at most 30 µm, more preferably at most 20 µm, more preferably at most 10 µm, more preferably at most 5 µm.

It is expressly stated here that a suitable range for the thickness of the nanoporous material may be formed using any combination of the listed preferred lower limits for the thickness with any of the listed preferred upper limits for the thickness.

It is preferred that the nanoporous material of the second aspect is a polymeric material, more preferably a cross linked polymeric material. For example, the nanoporous material may be formed of a matrix component of a block copolymer material.

In the method according to the first aspect, it is preferred that the block copolymer material is formed into a film or sheet by deposition from a solution. For example, suitable films can be spin-cast. In the case of PS-b-PMMA, a suitable solvent is toluene.

The block copolymer material, before removal of the island component, may have a thickness in a range formed using any combination of the listed preferred lower limits for the thickness of the nanoporous material with any of the listed preferred upper limits for the thickness of the nanoporous material. However, it should be mentioned here that in preferred embodiments of the invention, the development of the nanoporous material from the island morphology block copolymer material tends to result in an increase in thickness of nanoporous material compared with the thickness of the block copolymer material. This increase in thickness may be at least 5%, for example, more preferably at least 10%, at least 15%, at least 20% or at least 25%. In one sense, therefore, the nanoporous material can be considered to be an expanded form of the matrix material of the block copolymer material.

The average thickness of the lamella in the structure may be at least 10 nm, more preferably at least 20 nm, more preferably at least 30 nm, more preferably at least 40 nm and more preferably at least 50 nm. The average thickness of the lamella in the structure may be at most 500 nm, more preferably at most 450 nm, more preferably at most 400 nm, more preferably at most 350 nm, more preferably at most 300 nm, more preferably at most 250 nm, more preferably at most 200 nm. It is expressly stated here that a suitable range for the thickness of the lamella in the structure may be formed using any combination of the listed preferred lower limits for the thickness with any of the listed preferred upper limits for the thickness.

The lamellae in the nanoporous structure may be provided at a characteristic periodic spacing This characteristic periodic spacing may be at least 20 nm, more preferably at least 40 nm, more preferably at least 60 nm, more preferably at least 80 nm and more preferably at least 100 nm. The characteristic periodic spacing of the lamella in the structure may be at most 1000 nm, more preferably at most 900 nm, more preferably at most 800 nm, more preferably at most 700 nm, more preferably at most 600 nm, more preferably at most 500 nm, more preferably at most 400 nm. It is expressly stated here that a suitable range for the spacing of the lamella in the structure may be formed using any combination of the listed preferred lower limits for the spacing with any of the listed preferred upper limits for the spacing.

The spacing layers in the nanoporous structure similarly may have an average thickness of at least 10 nm, more preferably at least 20 nm, more preferably at least 30 nm, more preferably at least 40 nm and more preferably at least 50 nm. The average thickness of the spacing layers in the structure may be at most 500 nm, more preferably at most 450 nm, more preferably at most 400 nm, more preferably at most 350 nm, more preferably at most 300 nm, more preferably at most 250 nm, more preferably at most 200 nm. It is expressly stated here that a suitable range for the thickness of the spacing layers in the structure may be formed using any combination of the listed preferred lower limits for the thickness with any of the listed preferred upper limits for the thickness. The average thickness of the spacing layers may correspond to the height of the spacing elements.

The spacing elements are preferably substantially columnar in structure. More precisely, it is preferred that the spacing elements are substantially catenoidal in structure, in the sense that they are wider close to the lamellar and have a narrowest portion towards the centre of the spacing layer. The spacing elements themselves are preferably solid (i.e. not hollow). The spacing elements are typically formed of the same material as the material of the lamellae.

Preferably, the pores penetrating through the lamellae are arranged in an array substantially corresponding to the arrangement of isolated islands in the block copolymer material. The pores penetrating through the lamellae may be arranged in a two dimensionally close packed array. For example, the array may be a hexagonal array. In some preferred embodiments, the array has long range order (at least within a domain of such order). However, in other preferred embodiments, the array may have only short range order, in the sense that each pore may have about (or exactly) six substantially nearest neighbour pores, arranged substantially hexagonally around the pore in the lamella.

Preferably, the average size of the pores extending through the lamellae is at least 1 nm. It is considered that the average size of these pores depends to an extent on the average size of the isolated islands in the copolymer material. These pores are typically open and each end, opening into respective spacing layers. Therefore the pore size is taken to be the diameter of the pore measured in a direction perpendicular to the planar direction of the lamella, the diameter being the diameter of a circle of equivalent cross section area to the cross sectional area of the pore in the plane of the lamella.

More preferably, the average size of the pores extending through the lamellae is at least 2 nm, still more preferably at least 3 nm, still more preferably at least 4 nm, still more preferably at least 5 nm, still more preferably at least 6 nm, still more preferably at least 7 nm, still more preferably at least 8 nm, still more preferably at least 9 nm, and still more preferably at least 10 nm. The average size of the pores extending through the lamellae may be at most 200 nm. However, more preferably, the average size of the pores extending through the lamellae is at most 150 nm, more preferably 100 nm, more preferably 90 nm, more preferably 80 nm, more preferably 70 nm, more preferably 60 nm, more preferably 50 nm, more preferably 40 nm. It is expressly stated here that a suitable range for the average size of the pores extending through the lamellae may be formed using any combination of the listed preferred lower limits for the pore size with any of the listed preferred upper limits for the pore size. Preferably, the pore size distribution is narrow. This is advantageous, since it allows for a high efficiency of the material when used as a sieve or filter. The pore size distribution may be defined by the standard deviation of the pore size. Preferably, the standard deviation of the pore size of these pores is at most 30%. More preferably, the standard deviation of the pore size these pores is at most 20%.

Preferably, the matrix component of the block copolymer comprises PS. The island component of the block copolymer may comprise one or more of PMMA, PI and PBD. PMMA is most preferred.

Preferably, the arrangement of pores through the lamella corresponds to the arrangement of isolated islands in the block copolymer material. However, preferably the porosity of the spacing layer does not correspond to the arrangement of isolated islands in the block copolymer material.

In a third preferred aspect, the present invention provides a use of a nanoporous material according to the second aspect as a filtration medium in a filtration process.

In a fourth preferred aspect, the present invention provides a filtration membrane, wherein a filter substrate is provided and a nanoporous material according to the second aspect is provided on the filter substrate or in the filter substrate.

The filter substrate may, for example, be a relatively coarse filter substrate, having relatively coarse porosity. The nanoporous material may be provided to plug the porosity of the filter substrate. The nanoporous material may be provided only in a region of the filter substrate, e.g. in a region at or close to a surface of the filter substrate. Thus, in some embodiments, the nanoporous material may not be provided as a film, but instead as an array of plugging portions in a filter substrate. It has been found that the nanoporous material can provide very high filtration efficiency in this format.

In a fifth preferred aspect, the present invention provides a process for the manufacture of a nanoporous medium, including the step of introducing a second material into a template formed of a nanoporous material according to the second aspect, thereby at least partially filling the porosity of the template nanoporous material, and then at least partly removing the template nanoporous material to leave the nanoporous medium or precursor thereof at least partly formed from the second material.

In a sixth preferred aspect, the present invention provides a process for the manufacture of a nanoporous medium, including the step of introducing a second material into a template formed of a nanoporous material formed using the method of the first aspect, thereby at least partially filling the porosity of the template nanoporous material, and then at least partly removing the template nanoporous material to leave the nanoporous medium or precursor thereof at least partly formed from the second material.

Preferably the template nanoporous material is removed using a heat treatment. Alternatively, the template nanoporous material may be removed by dissolution. This may be achieved, for example, using a solvent which selectively dissolves the template nanoporous material in preference to the second material. However, in that case, it is preferred that the second material has sufficient strength to be self-supporting during and after the template nanoporous material is removed.

Preferably, the second material is subjected to a heat treatment. This may be the same heat treatment as that used to remove the template nanoporous material, where the template nanoporous material is removed by a heat treatment. Alternatively, a further heat treatment may be applied. In this heat treatment, the second material may react or sinter in order to increase the strength of the nanoporous medium.

The nanoporous medium may be formed using a wide range of materials, such as metals, alloys, ceramic materials, cermets, etc. Suitable ceramic materials include inorganic materials such as metal oxides, e.g. titanium oxide. The nanoporous medium may be used in an electrode for a supercapacitor or in an electrode for a fuel cell.

The present inventors have realised that their invention may also have applicability in the field of energy storage, in particular (but not exclusively) in the field of supercapacitors. A recent review of supercapacitors (also called electrochemical capacitors) is set out by Simon and Gogotsi [P. Siman and Y Gogotsi "Materials for Electrochemical Capacitors" Nature Materials Vol. 7 Nov. 2008 p. 845], the content of this review paper being incorporated herein by reference in its entirety. Therefore, the background, typical structure and principles of operation of supercapacitors will not be set out here, since it will be known to the skilled person.

The present inventors have realised that the method of the first aspect and/or the method of the fifth or sixth aspect may be used in a method of manufacturing an electrode for a supercapacitor. Similarly, the nanoporous material of the second aspect may be used to manufacture an electrode for a supercapacitor.

However, it is considered that the invention may have a broader scope than this, since to the inventors' knowledge, it has not been proposed before to manufacture supercapacitor electrodes using any porous solid template structure formed using block copolymers. This includes a porous solid template structure formed using the isolated island approach set out with respect to the first aspect, but also a porous solid template structure formed using alternative morphologies, including the gyroid morphology.

Accordingly, in a seventh aspect, the present invention provides a method for the manufacture of a supercapacitor electrode including forming a polymeric nanoporous material template using the steps:

forming a morphology comprising a three dimensional arrangement of a first component of a block copolymer in a continuous matrix formed of at least one matrix component of the block copolymer; and selectively removing the first component to leave the matrix with an array of interconnected pores and subsequently forming the supercapacitor electrode using the step:

introducing a second material into the template, thereby at least partially filling the porosity of the template, and at least partly removing or degrading the template wherein the second material is a supercapacitor dielectric material or a precursor thereof.

The morphology of the block copolymer may be one in which the first component forms isolated islands in the matrix, as with respect to the first aspect. In that case, any of the preferred features of the invention with respect to the first aspect can be applied to the seventh aspect. However, it is also possible for the morphology of the block copolymer to be one in which the first component forms an interconnected network isolated in the matrix. In that case, the first component and the matrix component may be bicontinuous. For example, the block copolymer may form a gyroid structure. In these circumstances, any of the preferred features of the invention with respect to the first aspect may be applied to the seventh aspect (e.g. dimensions, compositions, etc.), with the caveat that the islands can be considered to be interconnected.

With respect to the structure and/or composition of the polymeric nanoporous material template, any of the preferred features of the invention with respect to the second aspect can be applied to the seventh aspect.

Preferably the template is removed using a heat treatment. Alternatively, the template may be removed by dissolution. This may be achieved, for example, using a solvent which selectively dissolves the template in preference to the second material. However, in that case, it is preferred that the second material has sufficient strength to be self-supporting during and after the template is removed.

Preferably, the second material is subjected to a heat treatment. This may be the same heat treatment as that used to remove the template, where the template is removed by a heat treatment. Alternatively, a further heat treatment may be applied. In this heat treatment, the second material may react or sinter in order to increase the strength of the supercapacitor electrode.

Preferably, the supercapacitor dielectric material comprises a material selected from the group consisting of: $RuO_2$, $IrO_2$, $NiO$, $CoO_x$, and $MnO_2$. Of these, most preferred is $MnO_2$.

Preferably, the matrix component of the template is pyrolysed in order to form an interconnected carbon-rich network. This interconnected carbon-rich network is preferably bicontinuous with the supercapacitor dielectric material. Pyrolysis is preferably carried out in an inert atmosphere. This is to avoid significant oxidation of the polymer. For example, a heat treatment in the temperature range 300-500° C. is preferred in order to achieve pyrolysis. The same heat treatment may provide at least partial sintering of the supercapacitor dielectric material. The resultant structure has a pseudo-capacitance enhancement effect to the double-layer capacitance.

In an eighth aspect, the present invention preferably provides a method of manufacturing a supercapacitor, including a method of manufacturing a supercapacitor electrode according to the seventh aspect and using the supercapacitor electrode to form a supercapacitor, optionally by inserting a separator layer between adjacent supercapacitor electrode layers in a layered supercapacitor structure.

Further optional features of the invention are set out below.

Figure 1:
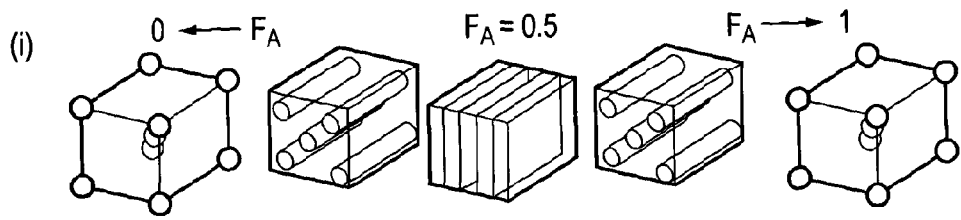
FIG. 1 shows schematic microstructural morphologies of block copolymer A-b-B, depending on $F_A$ (the volume fraction of component A).

DETAILED DESCRIPTION OF THE PREFERRED EMBODIMENTS, AND FURTHER OPTIONAL FEATURES OF THE INVENTION

Nanoporous materials have a recognized application in a broad range of technology platforms. Specific examples where the preparation of such materials can meet a technology need are in the development of low-K dielectrics in microelectronics, high surface area inorganic electrodes for dye-sensitized solar cells and metallized electrodes for fuel cells, and a number of membrane purification processes. As these examples show, one typical configuration of suitable materials for these applications is as a thin or selective layer.

The present inventors consider that the development of nanoporous materials via self-assembly based methods would be advantageous, in view of the relatively low potential number of processing steps. Suitable methods preferably have little or no requirement for vacuum or clean-room conditions, as may otherwise be required for forming suitable structures by top-down fabrication methods such as lithography.

However, some self-assembly methods have disadvantages. For example, in order to form a required nanoporous material, it is often necessary to use a very tightly defined material composition. Furthermore, it is typical that the substrate on which the nonoporous material is made must be very carefully selected. Still further, the dynamics by which the nanoporous material are created may be very slow and/or ultimately unstable. Further still, the scalability of the process itself may be questionable.

The present inventors have devised robust methods to create new nanoporous materials. In the preferred embodiments, the process uses cross-linking, photodegradation and chemical washing of initially spherical micellar systems that result in a bicontinuous matrix of polymers and voids. The inventors demonstrate the value of these nanoporous materials using the specific applications of water purification and energy generation, although the present invention is to be understood as not necessarily being limited to these exemplary applications.

There are considered to be a number of basic requirements for a high-performance nanoporous material. One is the high degree of accessibility of the pore structures. By implication, this suggests that the available surface area per unit volume in the material between void and material should be high, preferably as high as possible. Another is the intrinsic strength. This is again related to the connectivity of the non-void parts of the material. From a technological point of view, it is preferred if these materials are prepared as quickly and as cheaply as possible.

There are a number of key technologies where nanoporous media have been critical in enhancing functionality. In both fuel cell and dye-sensitized solar cells, this is seen by increasing the local surface area of the platinized and titanium oxide electrodes. Reducing pore sizes whilst maintaining a satisfactory continuity from top-to-bottom in separation membranes will enable the application of these systems for reverse osmosis. Doing so in a practical way would enhance the viability of membrane separation to replace conventional, expensive and cumbersome distillation based desalination technologies with smaller, lower-tech solutions. It is notable that the research impacts of nanoporous media have relevance to the sustainability of two key resources.

Nanoporous polymeric membranes with good interconnectivity can be produced using a number of methods that invoke microphase separation. Thus demixing of two polymers can be dynamically controlled to vary the size scale of pore sizes and the extent of their connectivity. Another dynamic method that in principal produces connected nanopores is the so-called breath-figure method via the condensation of water vapor into a drying polymer film. These materials can then be used as a template for further chemical transformation of the material. For example the voids can be filled with inorganic or metal precursors, reduced and sintered to remove the organic components.

There are numerous ways to make a nanoporous inorganic material; for example, simple cheap nanoporous inorganic materials can be prepared by the sol-gel method and subsequent sintering. The resulting material can be considered to be a collapsed anisotropic heap of inorganic spheres (of a chemically controlled dimension and size distribution). Inevitably such a material contain dead void spaces (i.e. closed pores) that are completed encapsulated by a surrounding network of spheres. An additional disadvantage is that the material, during sintering is prone to macroscopic, shrinkage-induced crack-formation that undermines the mechanical properties of the material, and in some cases, the ability of the material to self-support itself. The present inventors consider that using a polymeric template of controlled connectivity to control the way in which the sol collapses is one way to enhance the accessibility of the void structures.

An advance in the sol-gel technique has been to combine this process with self-assembly of systems that undergo a phase transformation to a nanoperiodic lattice. Amphiphilic surfactants such as the Pluronics™ (also known as poloxamers—nonionic triblock copolymers composed of a central hydrophobic chain of poly(propylene oxide) flanked by two hydrophilic chains of poly(ethylene oxide)) have been used to create these gel-like lattices with regular architectures including packed spherical micelles and hexagonally arranged cylinder phases. By generating the sol within the aqueous phase of the gel, and subsequently transforming the material, the resulting inorganic monolith structure is templated by the lyotropic architecture of the surfactant. This concept has been extended further by utilizing block copolymer that are not necessarily amphiphilic but which have the advantage of greater flexibility via the polymer chain length and the monomeric interactions. Several research groups have explored this general concept for the development of nanoporous organic and inorganic media.

In using block copolymers to template nanoporous structures, some disadvantages are prominent, for example the material cost. Typically the key volume over which the nanoporous structure performs its separating function is a few hundred nanometers. This is as true of membranes formed by Loeb-Sourrijan type phase inversion methods as block copolymers. The remainder of the membrane material is mainly there to provide a geometrical and mechanical support. Hence it is preferred to ensure that the selective portion of the membrane is fully open and accessible from the more macroporous sections of the membrane. However it is well known that block copolymer (BCP) films, that might form the selective layer, tend to have one component of the BCP preferentially wetting the bounding surfaces of the film. Moreover, depending on the particular architecture of the BCP, its orientation may not be conducive to direct diffusing species across the membrane. Some attention has been given to creating BCP films with a cylindrical morphology (later to become cylindrical pores) with an orientation that runs across the films. This has been achieved by a number of methods involving external fields or by the dynamic evaporation of selective solvents. However there is a possibility that such methods can be difficult to scale up and/or control. A more elegant method makes use of the thermodynamically stable double gyroid phase that is observed in some block copolymers, in which the two components of such BCP films are intrinsically connected throughout the film. However the relative polymer compositions and molecular weight window at which the double gyroid system exists is sensitive and the architecture has only been noted for a handful of polymer systems. Moreover, time-consuming solvent annealing methods found to be the best to achieve the double gyroid structure. Even in these cases, it is found that the surfaces of the thin films still contain a wetting layer of one BCP component that can act as a barrier to any prospective porous properties.

In the preferred embodiments of the present invention, a nanoporous structure is prepared by the selective crosslinking and/or degradation of the two polymer phases. In the well studied polystyrene (PS) block copolymer systems with poly (methyl methacrylate) (PMMA), polyisoprene (PI) and polybutadiene (PBD), this is achieved with a combination of UV/ozone and subsequent dialysis of the degraded phase. In other systems, simple hydrolysis of one component is sufficient to create the nanoporous network.

One of the assumptions that is apparently implicit in much of the reported work in this area is that UV induced crosslinking and degradation of the BCP leads to creating a replica of the original BCP architecture. Indeed this is seen experimentally for cylindrical and lamellar systems of PS-b-PMMA. In the former case, PMMA cylinders have been degraded from the PS matrix and subsequently refilled. In the case of perpendicular lamellae, the degradation of the interlayers of PMMA leads to a collapsed structure of cross-linked PS sheets. The assumption, that seems to be implicit in the reported work, is that the same UV process will have no benefit to a system of PS-PMMA spherical micelles, with a PMMA minor phase, since the resulting degraded phase, if one can remove it at all, remains separated from other similar voids. The present inventors have, however, observed that this assumption is not correct. As explained below, this has important implications for the manufacture of nanoporous materials.

Block copolymers are able to produce a range of geometrically organized three dimensional (3D) architectures. The architectures depend mainly on the relative fraction of each of the polymer phases. The simplest block copolymer, an A-block-B (abbreviated to A-b-B), is able to produce four distinct microstructural morphologies, depending on $F_A$ (the volume fraction of component A). Three of these morphologies are illustrated in FIG. 1, showing an arrangement of isolated spherical islands of A in a continuous matrix of B at low values of $F_A$. As the value of $F_A$ increases, the morphology changes to provide an arrangement of parallel cylinders of A, isolated from each other, in a continuous matrix of B. At $F_A=0.5$, in this example, the morphology provides alternating lamellae of A and B. As $F_A$ is increased still further, the morphology changes to provide an arrangement of isolated spherical islands of B in a continuous matrix of A. Thus, each of these morphologies is non-bicontinuous.

Figure 2:
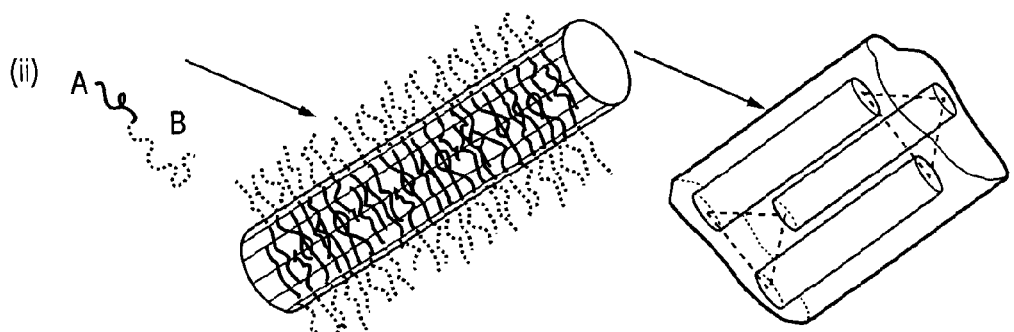
FIG. 2 schematically shows the formation of interfaces between A and B in the structures show in FIG. 1, taking the cylindrical morphology as an example here.

FIG. 2 illustrates the reason for the formation of interfaces between A and B in the structures show in FIG. 1, taking the cylindrical morphology as an example here. Diblock copolymer A-block-B prefers to arrange itself (for energetic reasons) to minimise the interface area between A and B. In the example shown in FIG. 2, cylinders of A are formed, surrounded by a matrix of B.

Figure 3:
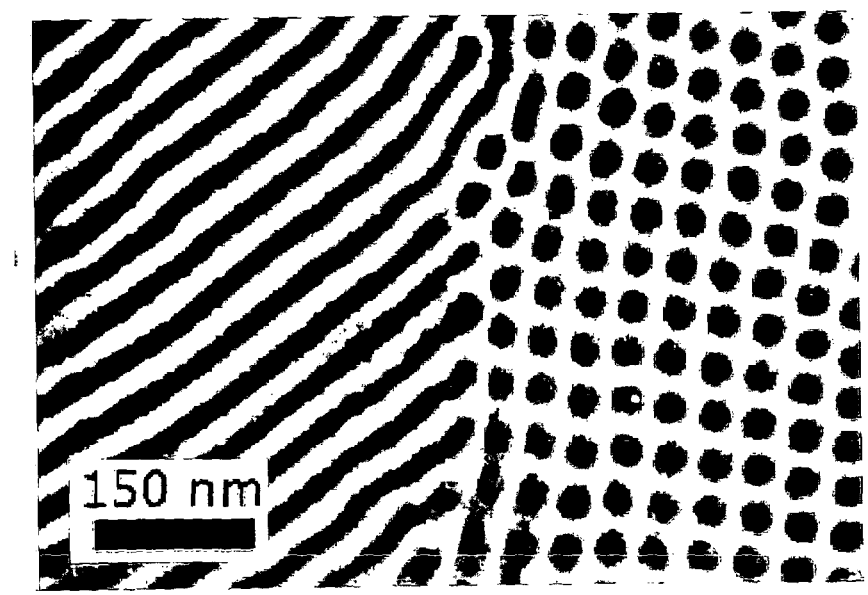
FIG. 3 shows an exemplary transmission electron microscopy (TEM) image of a microstructure of a cylindrical asymmetric block copolymer.

FIG. 3 shows an exemplary transmission electron microscopy (TEM) image of a microstructure of a cylindrical asymmetric block copolymer.

In FIGS. 1-3, and in the preferred embodiments of the invention, structure sizes (i.e. the average diameter of the isolated islands, the average diameter of the isolated cylinders and the average thickness of the parallel lamellae) are of the order of 10 nm-250 nm.

There is one morphology which is possible for some block copolymers in which the components are bicontinuous. This is the gyroid phase. See, for example, Crossland et al (2009). The bicontinuous architecture is unique in that, if either phase is removed from the system, the remaining structure can remain self supporting. A phase may be selectively removed from the gyroid architecture by an appropriate post-process and chemical washing.

Systems such as PS-PMMA, PS-PBD, PS-PI, can be irradiated by a combination of UV and ozone, to cross-link the PS phase and simultaneously degrade the other phase.

This other phase is commonly washed out with acetic acid (PMMA) or ethanol (PB, PI). For other systems, such as PFS-PLA, the polylactic acid can be hydrolyzed without the need to crosslink the PS phase. (Note that PFS is polyfluorostyrene.)

In the examples of the preferred embodiments, samples are irradiated with UV. A subsequent solvent wash develops a nanoporous self-supporting structure.

In the case of aligned cylinders of (for example) A in a continuous matrix of B, it is evident that when the matrix of B is crosslinked by irradiation with UV, this irradiation degrading A, it is possible to wash out the degraded A because the cylinders are accessible for washing because they extend though the material. However, where the morphology of the block copolymer has isolated islands of A in a continuous matrix of B, the islands should be inaccessible to the solvent wash.

Figure 4:
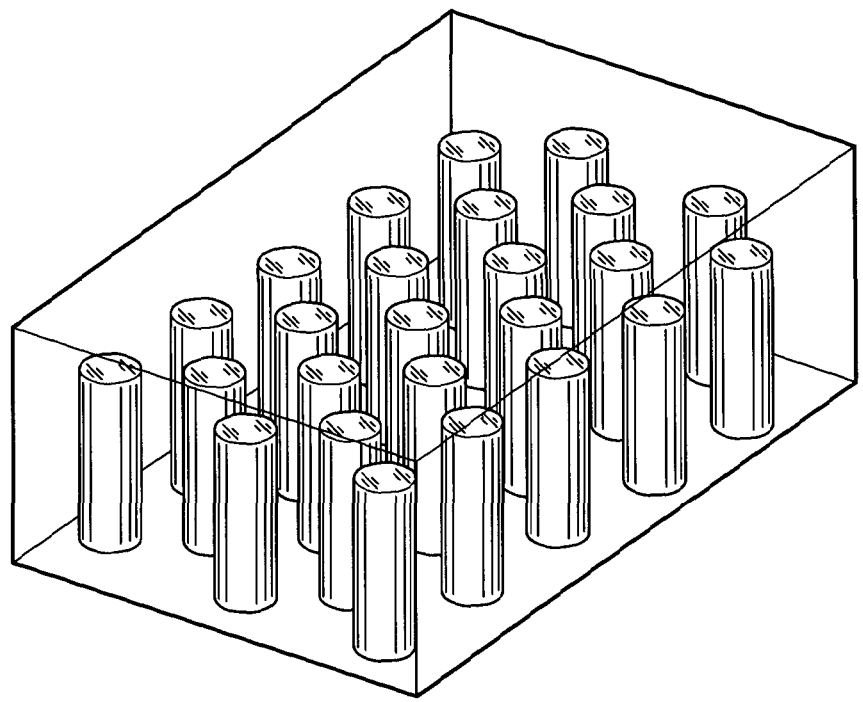
FIG. 4 shows a schematic view of a cylindrical morphology in a continuous matrix.
Figure 5:
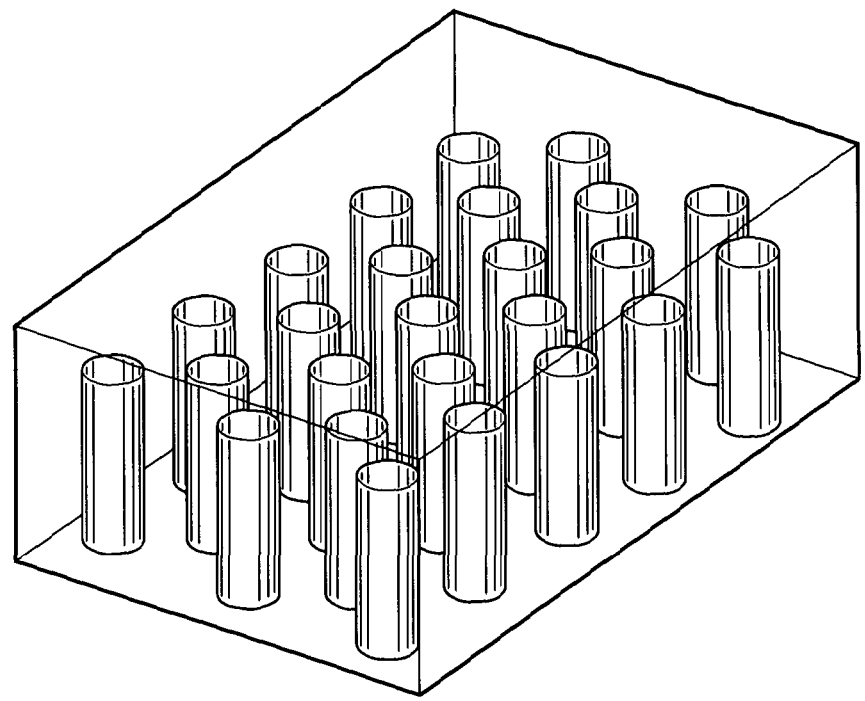
FIG. 5 shows a schematic view of the matrix of FIG. 4 after removal of the cylindrical phase.

FIG. 4 shows an array of cylinders of A in a continuous matrix of B. When the cylinders of A are removed, the structure of B is retained, as shown in FIG. 5. The same is true when a gyroid phase is used.

However, in the preferred embodiments of the present invention, there is a complete change in the final organization of the material to a entirely new type of structure that has not been reported before.

Figure 6:
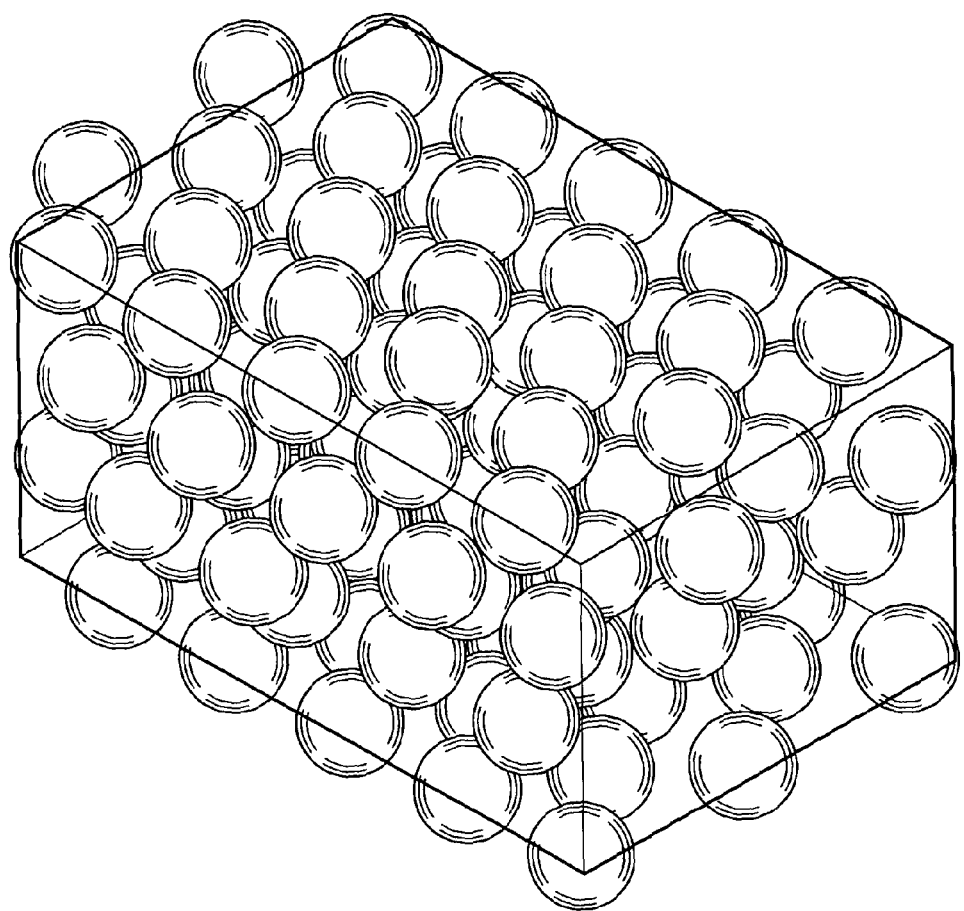
FIG. 6 shows a schematic view of a spherical micellar morphology in a continuous matrix.
Figure 7:
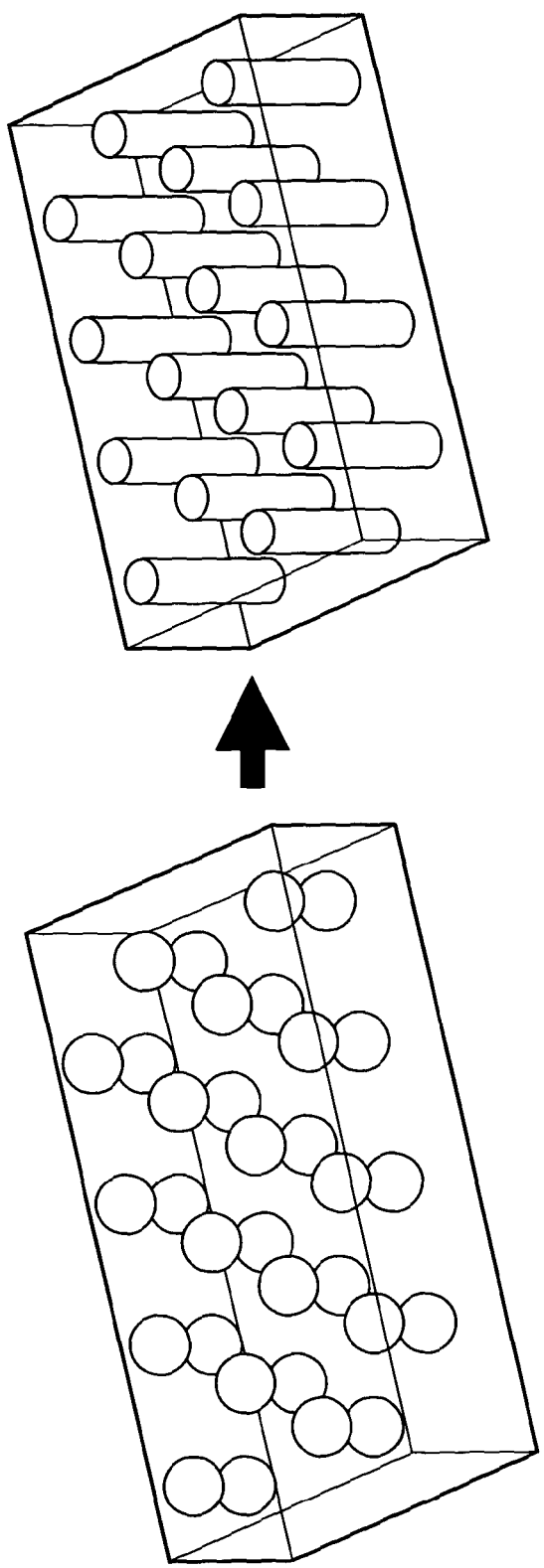
FIG. 7 shows a schematic view of a suggested mechanism for the development of an arrangement of isolated islands into pores extending through a lamella.

FIG. 6 shows an array of spherical A in a continuous matrix of B. In the example, A is PMMA and B is PS. This has not previously been considered an interesting system for UV/acetic acid treatments. When the structure is treated according to the preferred embodiments of the invention, the previously-isolated spherical islands are removed and the resultant structure forms a sheet of B having an array of pores extending through the sheet. This is schematically illustrated in FIG. 7.

Figure 8:
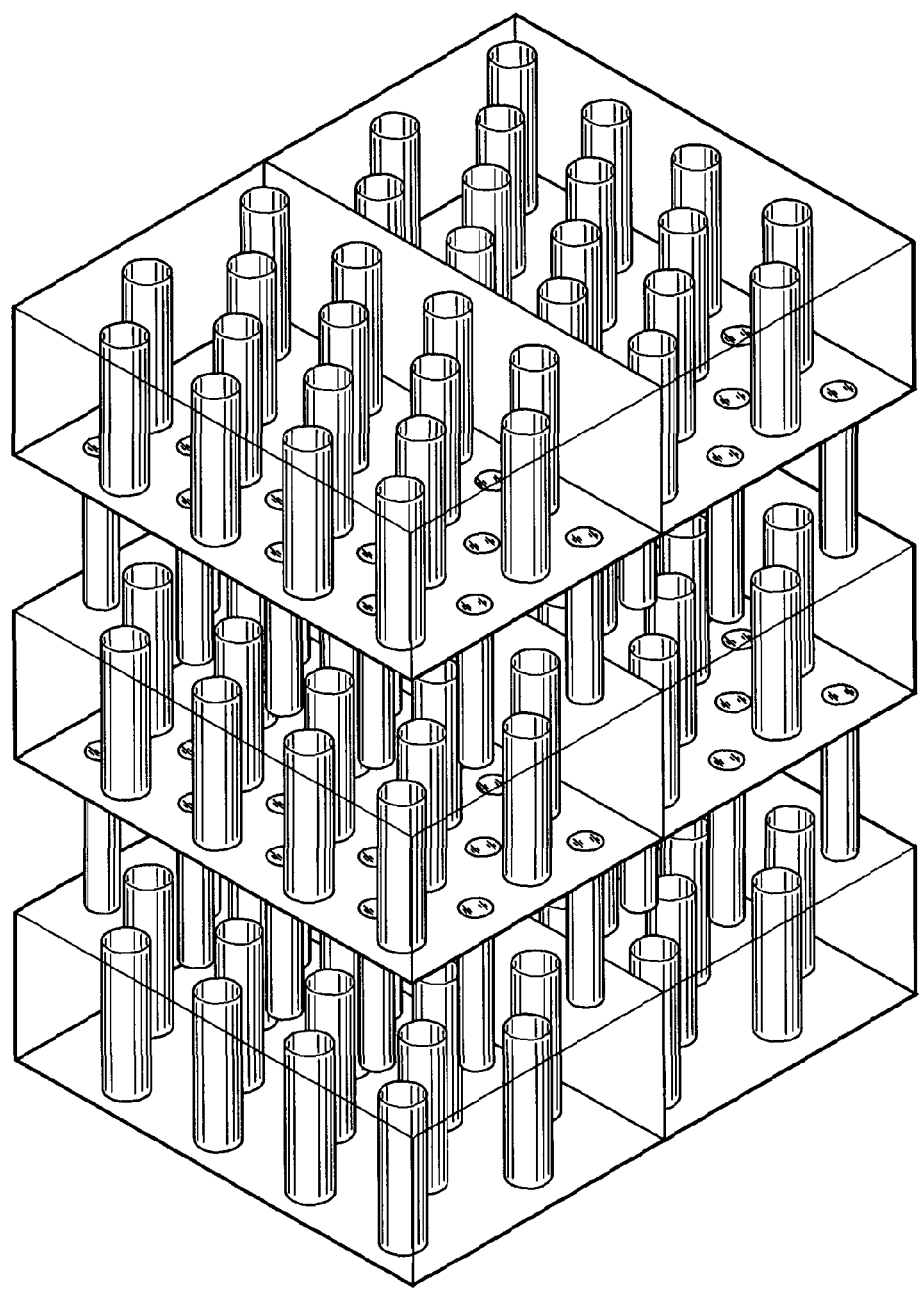
FIG. 8 shows a schematic view of a structure according to an embodiment of the invention.

However, in typical embodiments, the initial block copolymer structure has a thickness significantly greater than the diameter of the isolated spherical islands. Therefore the initial block copolymer structure accommodates a significant number of layers of isolated spherical islands. The result observed by the present inventors is that with a multiple initial array of layers of isolated spherical islands, with not all islands in one layer lying in register islands in layers underneath, the perforated sheets of B form lamellae separated by spacer layers providing supporting columns of B. The structure is schematically illustrated in FIG. 8.

The precise mechanism for the formation of this structure is still unknown. However (without wishing to be bound by theory), it is possible that the mechanism is a combined function of (i) expansion of the material starting from the point where the solvent (e.g. acetic acid) infiltrates the material and (ii) the collapse of the walls between two adjacent PMMA spheres. However, further detail on these points is described later, with reference to FIG. 37.

In order to manufacture nanoporous materials according to examples of the invention, block copolymers of PS-b-PMMA with known molecular weights were spun cast from a toluene solution to a thickness of 300-400 nm on silicon wafers (with a native oxide layer). Films of thickness of about 50 nm, were also transferred, via a glass slide intermediary, on to carbon coated TEM grids. The films were annealed at 230° C. under a nitrogen atmosphere. The samples were then placed 10 cm from a UV source in air before being rinsed in glacial acetic acid for 10 minutes. The duration of UV exposure was varied during the experiments. Film thicknesses were measured before and after exposure with AFM across a scratched section of the film. Microstructural dimensions (e.g. pore size, lamella thickness, spacing layer thickness) were measured based on SEM observations.

Figure 35:
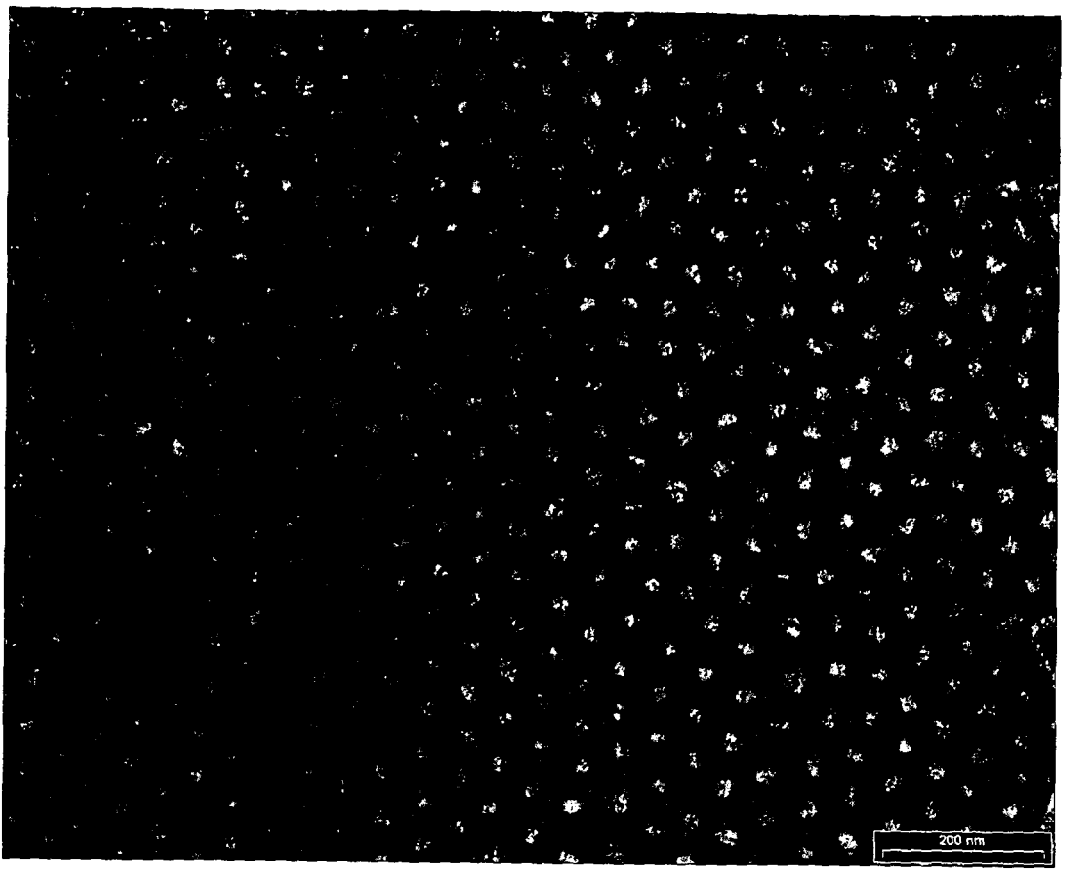
FIG. 35 shows a TEM micrograph of an annealed block copolymer film which has developed an isolated spherical island morphology of PMMA islands in a continuous matrix of PS.

Annealing of the BCP films at 230° C. developed the required isolated spherical island morphology of PMMA islands in a continuous matrix of PS. A TEM micrograph of such a film is shown in FIG. 35.

Figure 9:
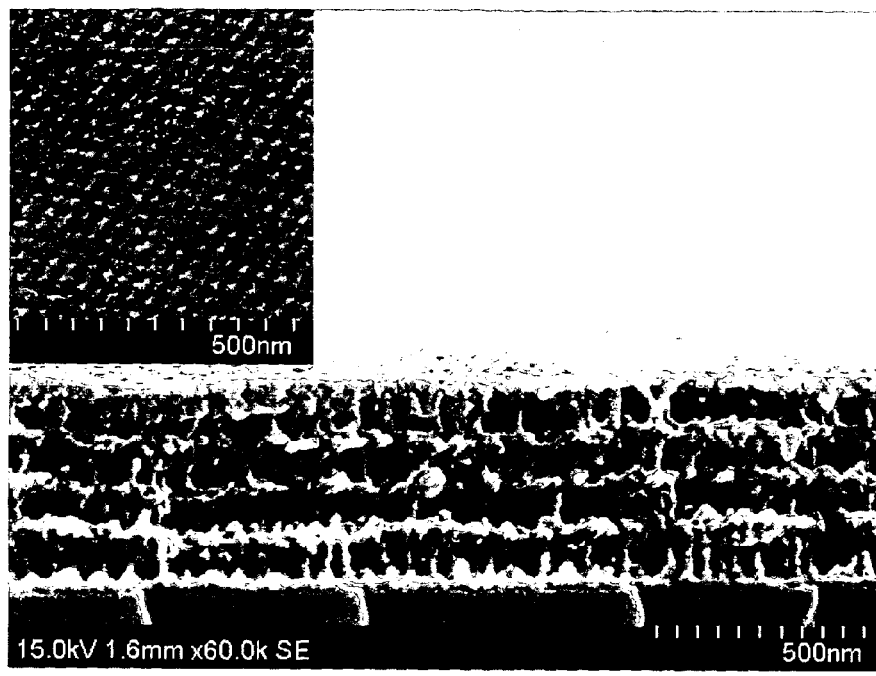
FIGS. 9-17 show SEM micrographs of various nanoporous materials according to embodiments of the invention.

After UV exposure and washing with glacial acetic acid, the surface of the polymer films were found to have a loosely hexagonally packed structure of pores. However, the cross-sections of these block copolymers, contained a clearly porous interconnected structure. This is shown in FIG. 9, discussed in more detail below. A similar three dimensional structure was observed for significantly thicker films (several tens of microns) that had been solvent cast, annealed and then subject to the same UV treatment. The sub-layers of the film take the form of parallel lamellae, each having the form of a continuous but perforated sieve, adjacent lamellae being separated by a columnar array of PS.

The same structure was observed for different block copolymer molecular weights used in this study. The difference however in the lamellar spacing was less than might be expected based only on a consideration of BCP molecular weight.

The inventors have carefully considered possible mechanisms that might be responsible for forming the microstructure seen in the nanoporous materials. The mechanism is, at the time of writing, not completely understood, but the formation of the desired microstructure is readily repeatable. Without wishing to be bound by theory, the inventors speculate that the cross-linking of the PS (due to UV irradiation) is likely to be non-uniform, at least during the initial stages of UV exposure, with the upper regions of the film receiving and absorbing a greater UV flux than the lower regions of the film, therefore providing a higher crosslinking density in the upper regions of the film, which in turn leads to a stiffness gradient across the film. The UV also acts to degrade the PMMA in the spheres. After UV exposure, the film is washed using acetic acid. PMMA (especially degraded PMMA) is readily soluble in acetic acid, but PS is not. The acetic acid therefore will cause swelling of the spheres, starting from the upper surface of the film. It is speculated that there is a chemical potential gradient which drives the acetic acid downwards through the structure, from sphere to sphere, and the resulting expansion of the spheres leads to PS material separating the spheres in the vertical direction to migrate towards the less stiff regions of the film, i.e. downwards. Thus, spheres may link in the vertical direction. However, the excess PS material available must be accommodated. Therefore it is speculated that this drives expansion of the structure, leading to the creation of the spacing layers formed of laterally interconnected void spaces and vertically extending cylinders of PS. The linked spheres result in the formation of vertically-extending pores in otherwise continuous sheets of PS. The inventors expect that further work will elucidate the mechanism further.

Figure 37:
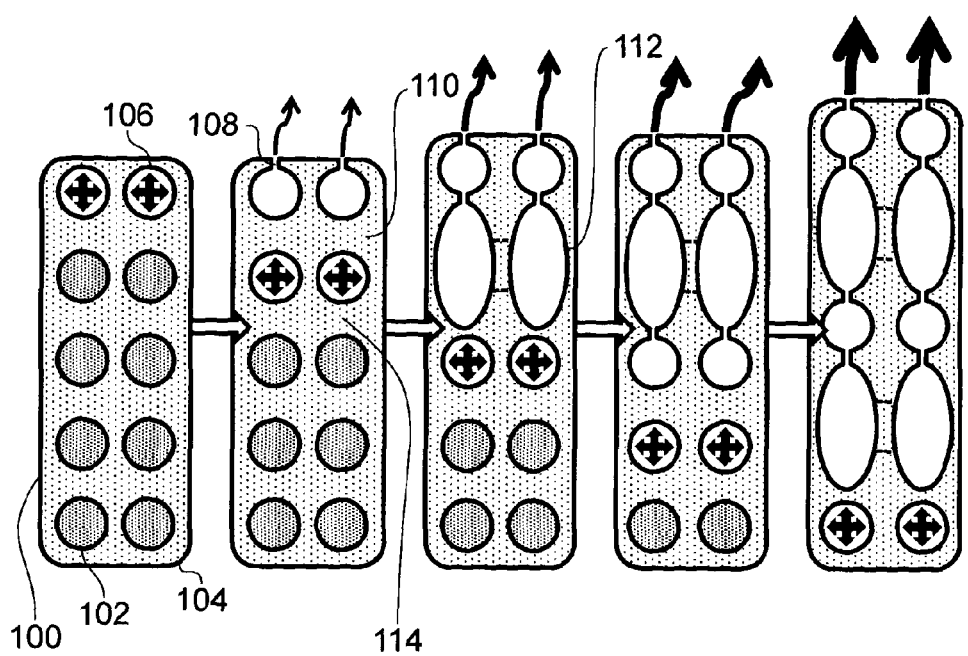
FIG. 37 shows a schematic illustration of a possible mechanism for the development of the porous morphology of the nanoporous material.

The likely mechanism for the development of the characteristic morphology is further explained with reference to FIG. 37. In this drawing, the material 100 has islands 102 arranged in a periodic arrangement in a matrix 104 of polymer that is undergoing crosslinking by UV radiation (not shown). The sequence of the formation of the microstructure is shown based on the removal of the material of the islands 102 in layer-by-layer stages in the drawing, from left to right.

The solvent (acetic acid in many of the examples) diffuses constantly in the matrix material, entering the islands, in view of the preferential solubility of the island component in the solvent. This increases the osmotic pressure in the islands. Due to the osmotic pressure, the thin layer 106 of matrix material separating the top layer of islands from the exterior of the material becomes perforated, allowing the mixture of solvent and island component to escape from surface perforations 108 and so relieving the osmotic pressure.

The solvent continues to diffuse in the matrix material, reaching the second layer of islands, below the already-perforated islands in the first layer beneath the surface. Similarly, osmotic pressure builds up in the second layer. However, the thickness of the layer 110 of matrix material between the islands in the first layer and the islands in the second layer is greater than for layer 106. Therefore the build up of osmotic pressure tends to elongate the islands, since this is the only direction in which the islands are able to expand to relieve the osmotic pressure, gradually reducing the thickness of layer 110 until it is perforated. The perforations link through to the pores (previously islands) in the first layer, allowing the mixture of the solvent and the island component to escape via the pores linked with perforations. The result is a layer in the material formed of elongated pores 112.

The expansion of the elongated pores 112 not only reduces the thickness of the layer 110 of matrix material above, but also the layer 114 of matrix material below. Accordingly, the expansion of the pore 112 results in a thin layer of matrix material below the layer of elongated pores. Therefore, when the next layer of islands is subjected to osmotic swelling, the wall of matrix material between the swelling island and the elongated pore is thin, and so easily perforated. Therefore this next layer of islands is not subjected to significant pressure and so does not become elongated. However, the layer of islands below this is subjected to significant osmotic pressure, and so does become elongated, as shown in FIG. 37.

The result is the characteristic lamellar structure shown in the SEM micrographs.

The upper surface of the PS-b-PMMA film, prior to degradation, was found to contain both PS and PMMA components. This was confirmed by staining the thin films with ruthenium tetroxide prior to SEM observation. This is a somewhat unsurprising result given that the surface tensions of the two BCP components are similar at the annealing conditions applied to the film. However, even under lower temperature annealing conditions where a PMMA wetting layer might exist at the surface, this is expected to be degraded under any UV exposure.

Measuring the interlayer distance via SEM shows an almost similar layer spacing independent of the original BCP molecular weight. However the sizes of pores within each sieve-like layer, measured from the SEM and correlated to TEM, are found to decrease with molecular weight.

From the cross-sections observed via SEM, the pores within spacing layers appear to be large with respect to the size of the original isolated spherical islands. It is advantageous that the size of the pores extending through the lamellae can be controlled by the original structure and molecular weight of the block copolymer. This brings about immediate applications of the materials as nanoscale sieves and/or filtration membranes. The fact that these materials are also cross-linked increase their resilience to mechanical and chemical attack.

It has previously been assumed that a morphology consisting of one block copolymer component contained in spheres, separated and isolated, albeit periodically from others, are not relevant since these spheres can not be accessed when the surrounding matrix is cross-linked. In fact, it has been shown by the present inventors that the surrounding matrix can open up to connect the degraded spherical phases. The resulting structure is by definition, a bicontinuous one. Furthermore, as discussed in more detail below, typical starting materials have an easy tolerance, allowing the achievement of the desired microstructure with relative ease. Typically, it can take as little as an hour to prepare such a bicontinuous porous material, requiring common laboratory equipment. By comparison, other bicontinuous structures as generated by the gyroid architecture require some dedicated annealing strategies, as well as being restricted to a particular composition and molecular weight window. A similar result can be achieved in other block copolymer combinations such as the PS-PI and PS-PB systems, though these requires two additional inputs; the removal of the surface wetting layer (e.g. by reactive ion etching), since a neutral air surface is not observed for these systems, and the additional use of ozone to enhance the degradation of the polydiene phases. A particular advantage of the isolated spherical morphology demonstrated in this work is the accessibility of the porous structures to the bounding interfaces either with air, or a liquid or a solid substrate due to the lack of a barrier wetting layer. This means that one no-longer needs to be concerned with the orientation of the block copolymer close to the surfaces, as is the case particularly with the cylindrical morphology.

FIG. 9 shows views of a sample made according to a preferred embodiment of the invention, taken using scanning electron microscopy (SEM). This sample is formed on a substrate, which is shown at the bottom of the view in FIG. 9. The cross sectional view shows 4 lamellae of crosslinked PS having pores extending through them, adjacent lamellae being spaced by relatively lower density spacer layers comprising supporting columns of crosslinked PS. The inset in FIG. 9 shows a plan view of the top surface, showing the substantially regular (hexagonal) arrangement of pores through the lamella at the top surface. The pores through the lamella have a narrow distribution of pore diameters.

Figure 10:
Figure 11:
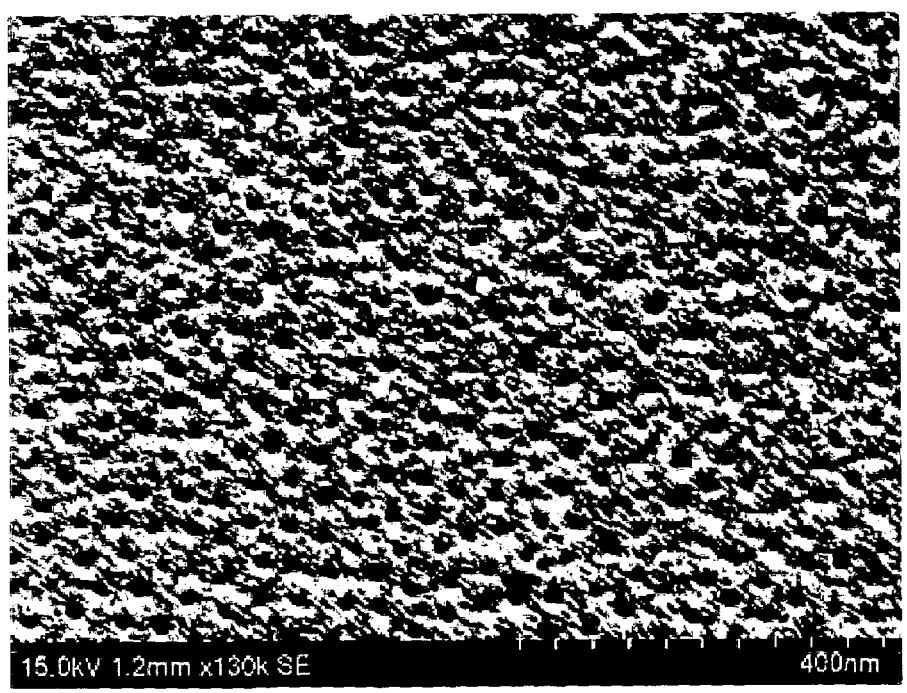

FIG. 10 shows a cross-sectional SEM view of another sample made according to a preferred embodiment of the invention. FIG. 11 shows a plan view of the sample.

Figure 12:
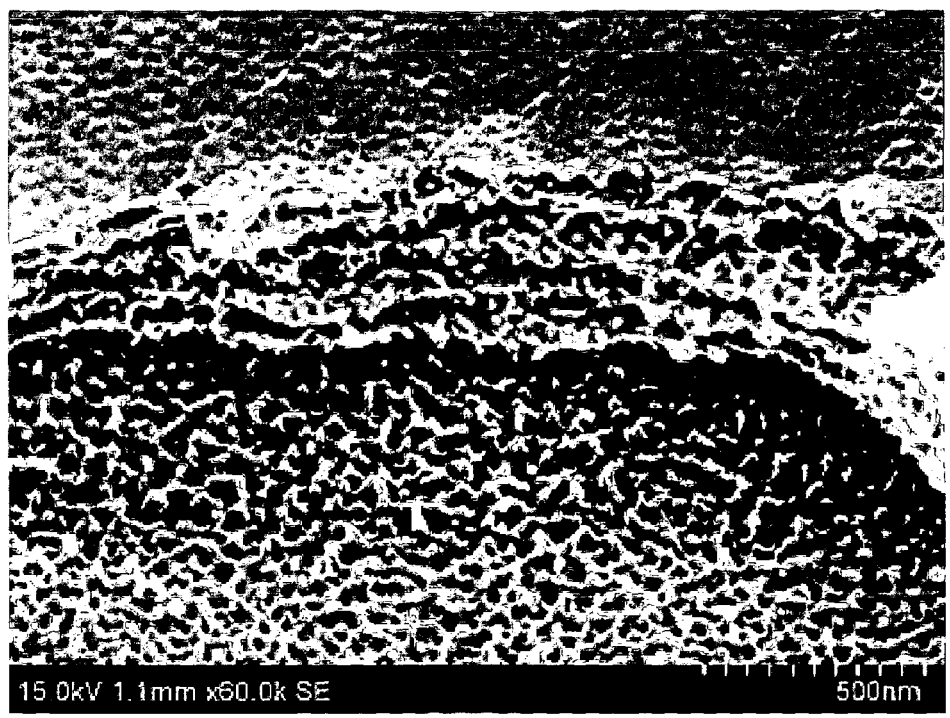
Figure 13:
Figure 14:
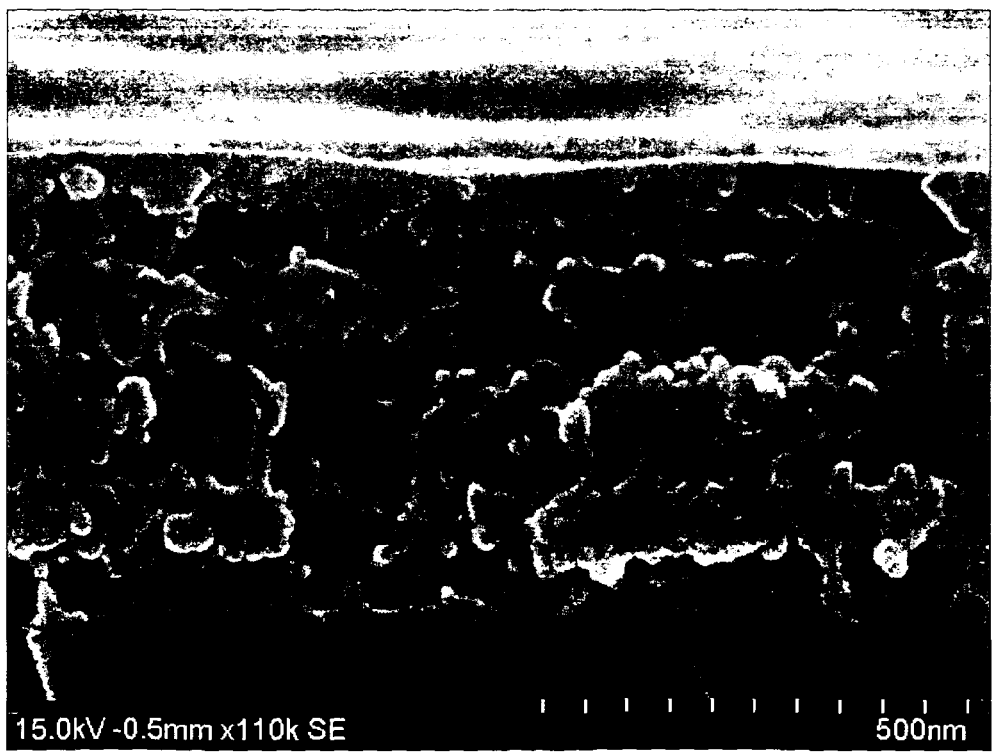
Figure 15:
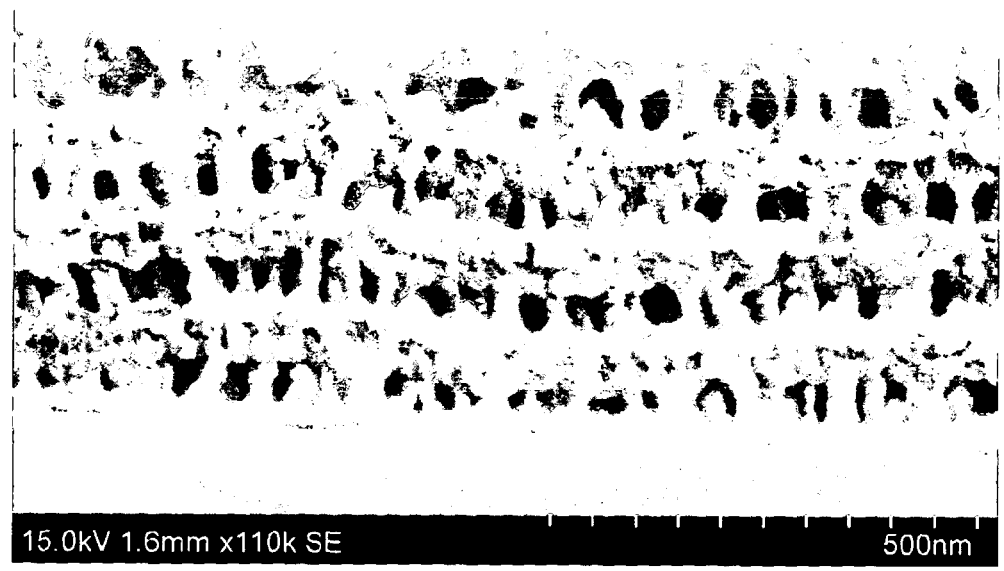
Figure 16:
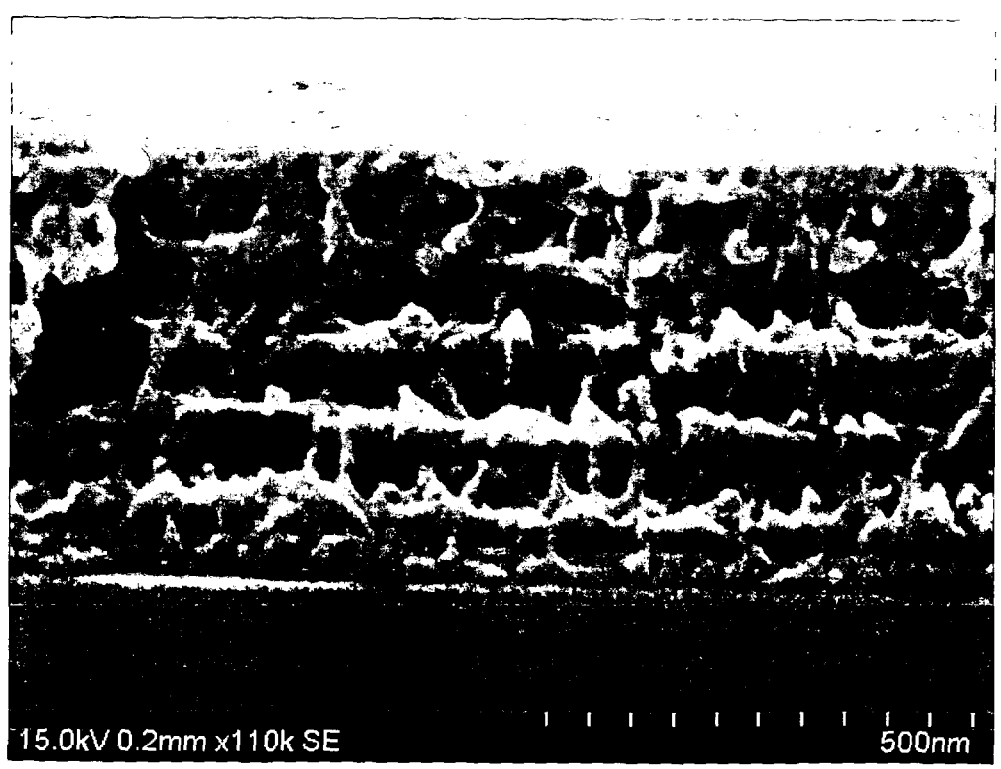
Figure 17:

FIG. 12 shown a perspective SEM view of another sample made according to a preferred embodiment of the invention. In this view, the upper layers of the sample have been peeled away to reveal the structure of the spacer layer.

FIG. 13-17 relate to each other. These show cross-sectional SEM views of samples made in order to demonstrate the compositional flexibility of the preferred embodiments of the invention. Each of these samples was made using a PS-PMMA diblock copolymer, but the molecular weights of the components (PS and PMMA) of the diblock copolymers, and the total molecular weight ($N_T$) of the diblock copolymers was varied according to Table 1:

TABLE 1

| FIG. | PS | PMMA | $N_T$ |
|---|---|---|---|
| 13 | 32k | 6k | 380 |
| 14 | 42k | 9k | 510 |
| 15 | 65k | 13k | 780 |
| 16 | 71k | 11k | 820 |
| 17 | 126k | 30k | 1560 |

Note that $N_T = M_{PS}/m_{PS} + M_{PMMA}/m_{PMMA}$ where $m_{PS}$ (=104) and $m_{PS}$ (=100) are the monomer molecular weights.

Figure 18:
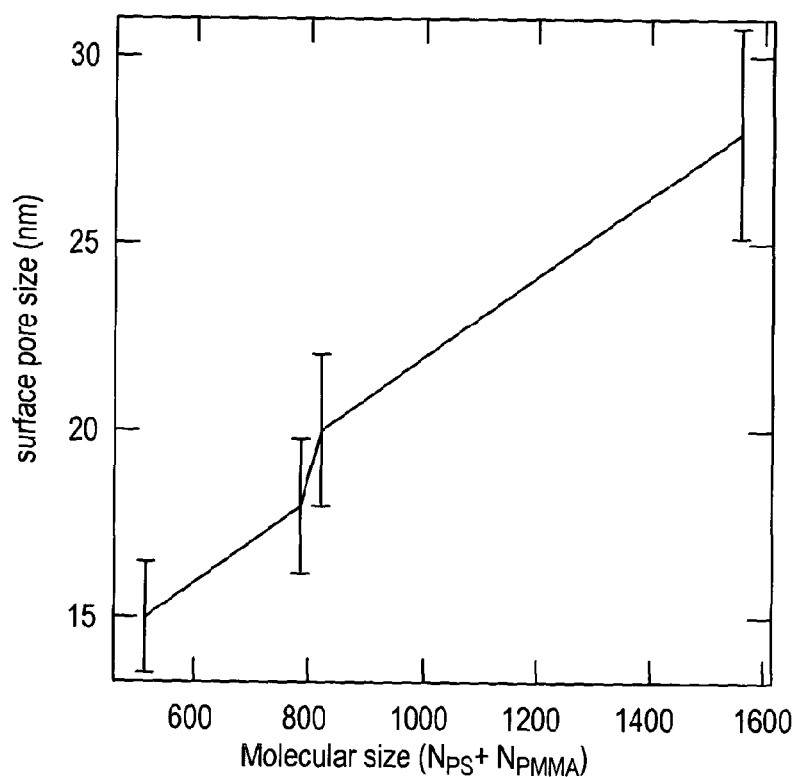
FIG. 18 shows a plot of surface pore size against molecular size of the block copolymer.
Figure 19:
FIGS. 19-26 show SEM micrographs of various nanoporous materials according to embodiments of the invention.

FIG. 18 plots the surface pore size of the samples of FIGS. 13-17 as a function of the total size of the copolymer ($N_T = N_{PS} + N_{PMMA}$).

FIGS. 13-18 demonstrate that the present invention can be made to work within a wide range of sizes of the copolymer. It is not considered that the thickness of the nanoporous material depends strongly on the molecular size of the copolymer, since thickness is likely to depend more strongly on the conditions of deposition of the copolymer.

The inventors further investigated the effects of the volume fraction of PMMA ($F_{PMMA}$) used in the starting composition, as shown in Table 2, and the results are shown in FIGS. 19-22.

TABLE 2

| FIG. | $F_{PMMA}$ |
|---|---|
| 19 | 0.28 |
| 20 | 0.255 |
| 21 | 0.23 |
| 22 | 0.205 |

Figure 20:
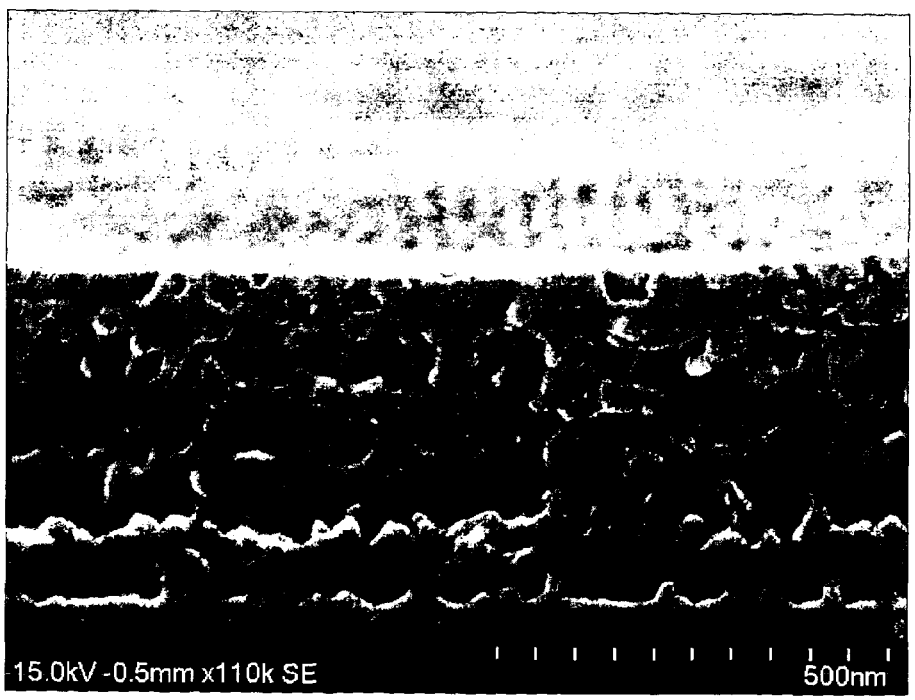
Figure 21:
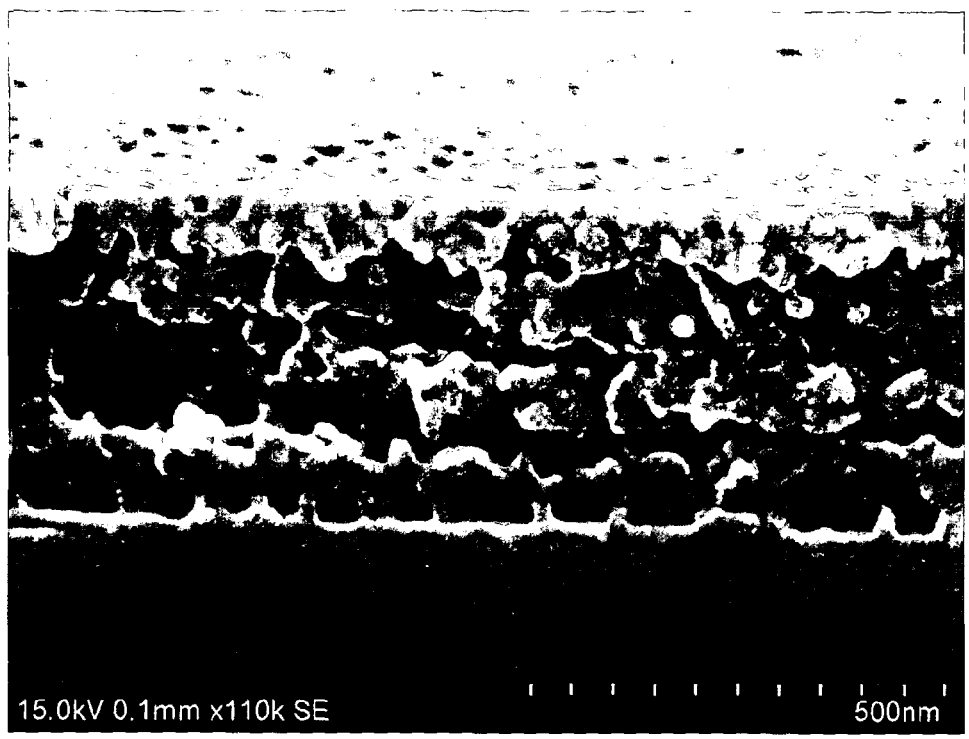
Figure 22:
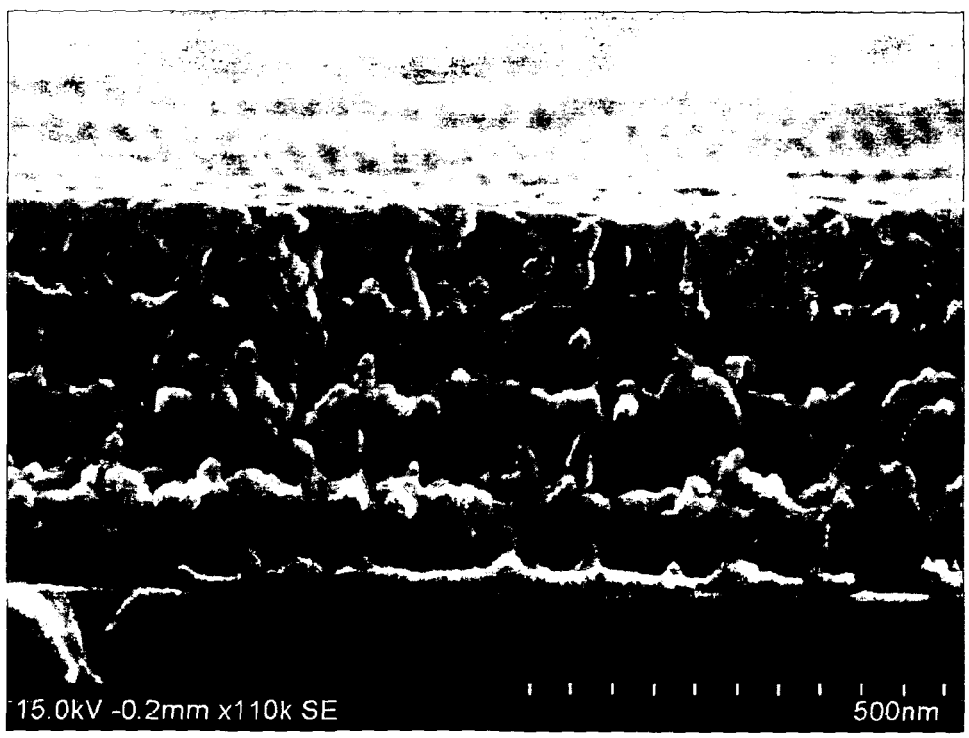
Figure 23:
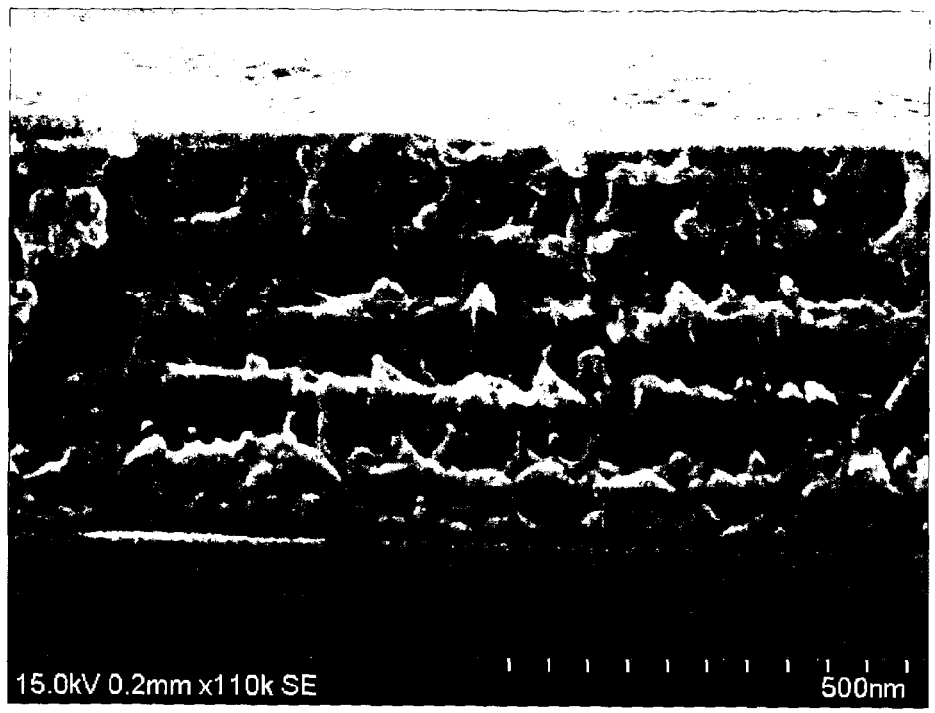
Figure 24:

In these experiments, the pure block copolymer had $F_{PMMA}$ of 0.28. This is in the cylindrical regime of the morphology phase diagram for PS-b-PMMA. Therefore, in the example shown in FIG. 19, the lamellar structure is not seen. $F_{PMMA}$ was varied by addition of PMMA homopolymer (31 k). As shown in the sequence of FIGS. 20, 21 and 22, the lamellar structure clearly develops as $F_{PMMA}$ is reduced to an appropriate level. Thus, the preferred structure is clearly available when $F_{PMMA}$ is around 0.20.

Furthermore, the inventors investigated the lower limit for $F_{PMMA}$ in this embodiment compositional system, using the values for the volume fraction of PMMA ($F_{PMMA}$) shown in Table 3. The results are shown in FIGS. 23-26. The starting material used in FIG. 23 was a 71 k-11 k PS-PMMA ($F_{PMMA}$=0.135). For the samples shown in FIGS. 24, 25 and 26, small amounts of PS homopolymer (31 k) were added.

TABLE 3

| FIG. | $F_{PMMA}$ |
|---|---|
| 23 | 0.135 |
| 24 | 0.105 |
| 25 | 0.08 |
| 26 | 0.055 |

Figure 25:
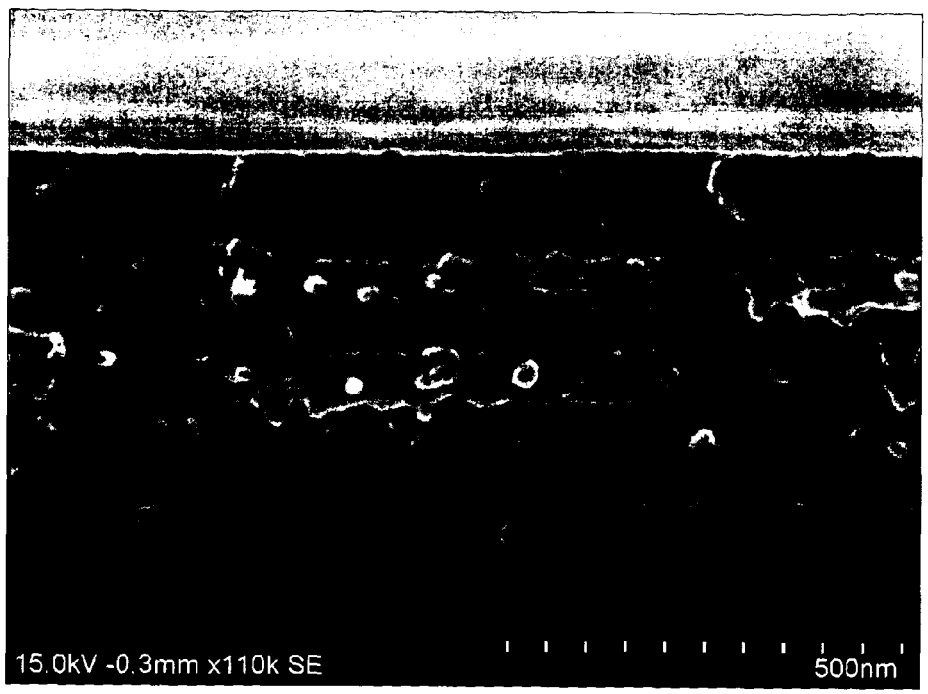
Figure 26:
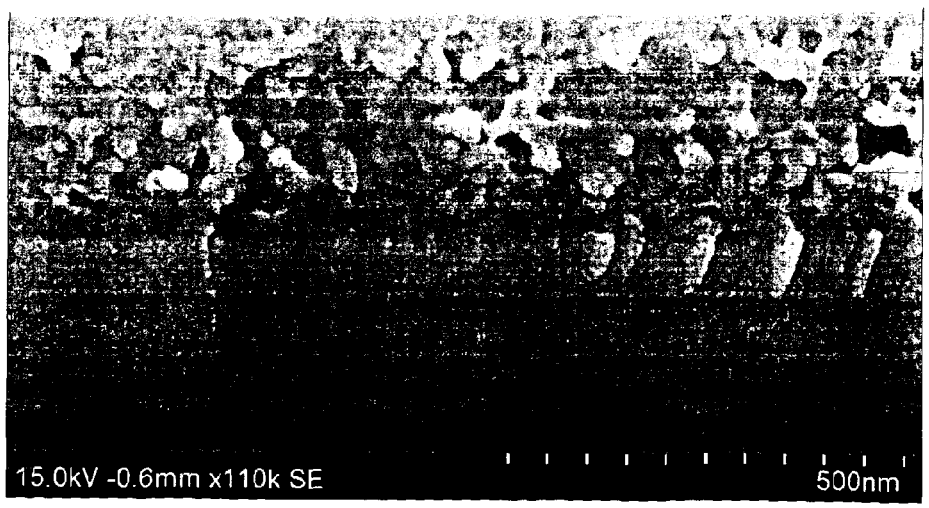

These results show that the lamellar structure remains available down to a relatively low level of $F_{PMMA}$ of about 0.08 (FIG. 25). The lamellar structure was not observed at $F_{PMMA}$ of 0.055 (FIG. 26).

The UV source in these experiments was characterized as UV (254 nm) providing 8 watts, spaced at 1.5 cm distance from the samples. This time and distance and power are interrelated by standard flux relationships. It was found that there was a critical time required for the UV exposure, typically about 30 minutes minimum for the samples tested in this work. It is probable that this threshold of UV exposure depends on various factors, including the thickness of the film, $N_T$ (see below) and the received flux of UV radiation. After UV exposure, for a time above a threshold time, there is a significant (20-30%) increase in the overall film thickness after washing with the solvent (acetic acid). However, this thickness change is not observed before washing with the solvent (acetic acid). This was checked macroscopically by observing the colour change of the samples caused by the thickness change. Thus, it was found that developing PS-PMMA structures that had been underexposed with UV did not lead to the open lamellar microstructures of the preferred embodiments.

Figure 27:
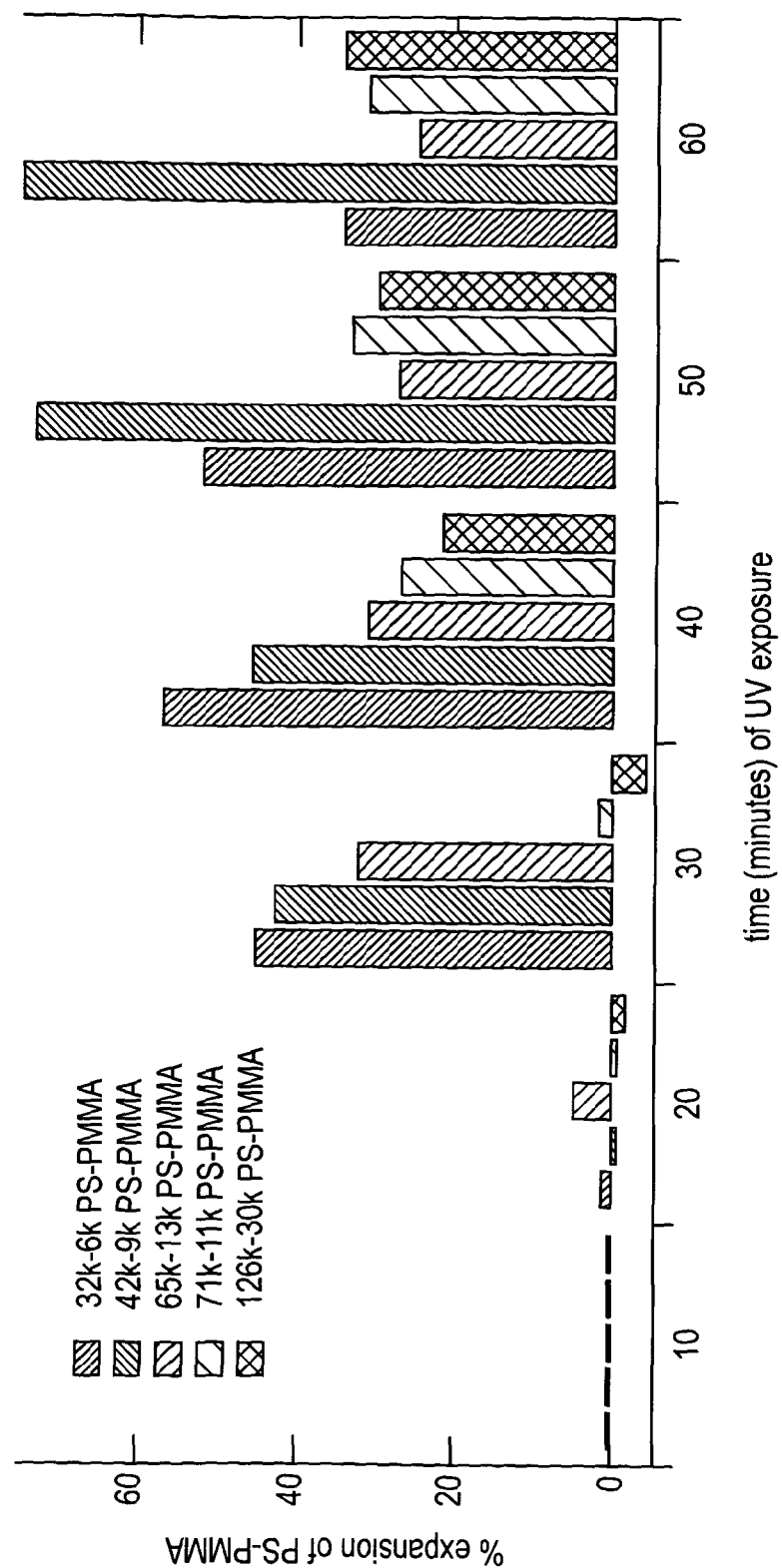
FIG. 27 shows the effect of duration of UV exposure on the development of expansion (after washing) of block copolymer various of different molecular weights.

Furthermore, the inventors have investigated the effect of $N_T$ on the time of UV exposure required in order to develop (after washing) the thickness change indicative of the transformation to the open lamellar microstructures of the preferred embodiments. This is demonstrated by the results presented in FIG. 27. In general, these results show that for a higher $N_T$, the time required for sufficient UV irradiation increases. Furthermore, it is found that there is a step change in thickness increase of the film at a threshold time, dependent on $N_T$. The step change in thickness was found to coincide with the change in the cross-section structure, from that of a non-porous film to that of the characteristic lamellar structure seen in FIG. 9, for example.

The present inventors used acetic acid to develop the structures of PS-PMMA. The inventors have investigated a large number of alternative organic solvents including other similar acids and alcohols and common solvents for PMMA. Specifically with respect to the PS-PMMA system, it is considered that acetic acid provides an unusual interaction in terms of developing the preferred open lamellar microstructure. However, it is possible that a combination of formic and acetic acid will have a similar effect on the material. It is considered likely that other solvent(s) will provide similar results for other block copolymer systems. It should be noted that acetic acid is a common solvent in clean-rooms and of wide-spread use.

Figure 28:
FIGS. 28 and 29 show SEM micrographs of a nanoporous material according to an embodiment after an acetic acid wash (FIG. 28) and after an acetic acid wash and then a methanol wash (FIG. 29).
Figure 29:
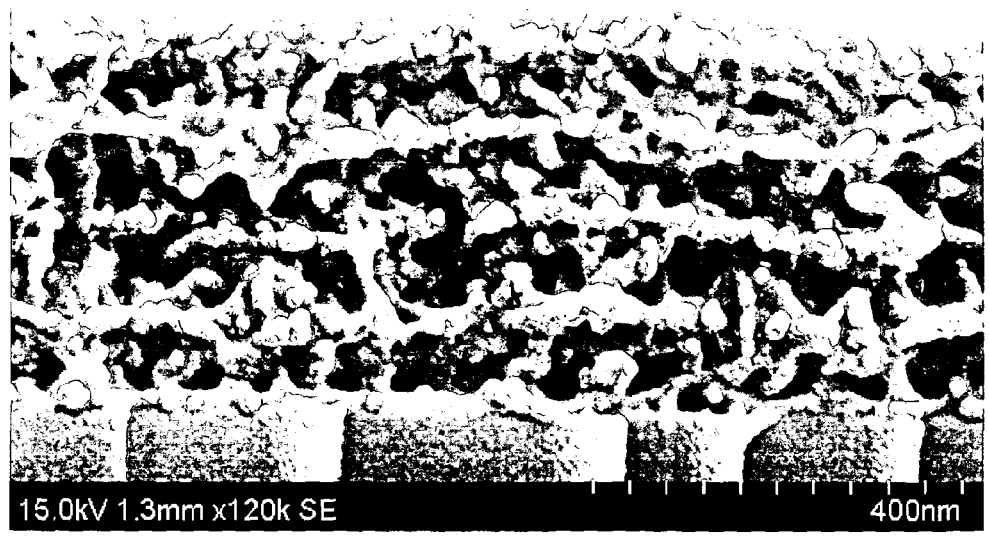

The inventors investigated the effect of methanol on the PS-PMMA system. The results are shown in FIGS. 28 and 29. In FIG. 28, the sample was washed with acetic acid only. In FIG. 29, the same sample was then washed with methanol. The effect is a contraction of the structure. It is speculated that the methanol penetrates into the structure and interacts with the surface of the PS to cause the PS chains to contract, leading to the observed contraction of the structure. This represents a means of controlling the average pore dimensions in the system. This was observed for all the pure block copolymer systems investigated by the inventors.

In order to further elucidate the relevant factors for developing the characteristic porous morphology, the present inventors have carried out further work, relating the atmosphere in which the cross linking is carried out.

PS-b-PMMA of a range of molecular weights were exposed to UV irradiation (λ=254 nm) for a range of dosages. The film thicknesses of these samples were noted, and the structure of the films determined by scanning electron microscopy. The following, same behaviour was noted for all the block copolymers molecular weights. Below a critical UV dosage (in air), the UV treatment followed by acetic acid treatment led to no substantial change in the polymer film thickness and there was no evolved structure of the type shown in FIG. 9. For samples irradiated in UV within a critical dosage range, there was an increase in film thickness after the UV/acetic acid treatment. These samples showed the open porous microstructures. However if the samples were exposed to too much UV, it was found that the sample thicknesses (post UV/acetic acid) were reduced monotonically.

Figure 36:
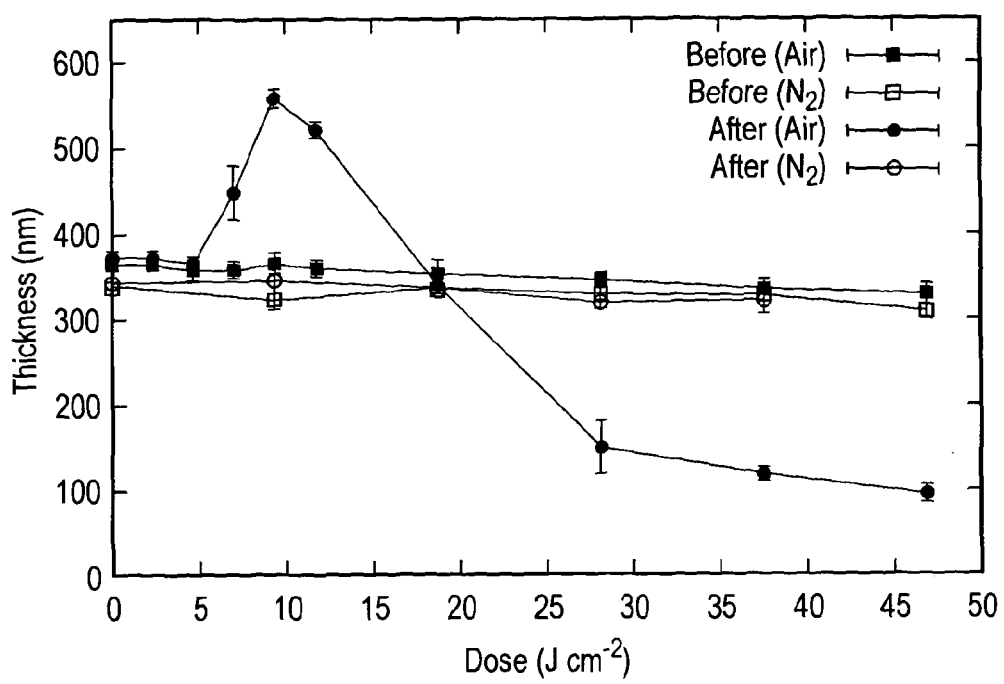
FIG. 36 shows a graph of the thickness of crosslinked samples based on UV dose, atmosphere and washing.

The same experiments were then repeated on a new set of samples; however in this case, the environment was almost entirely nitrogen (98%). It was noted that there was no change in the film thicknesses before and after the UV/acetic acid treatment, for any dosage. These details are summarized in FIG. 36, which plots the film thickness against UV dosage for films before washing and after washing in acetic acid, and cross linked in air or in nitrogen atmospheres. The material used was PS-b-PMMA (71 k-b-11 k).

The inventors' conclusion from these results is that the ozone is generated by the intense UV irradiation in an atmosphere containing oxygen. Ozone ($O_3$) is known as a highly reactive, short-lived allotrope of oxygen. It is thought that the ozone has the principal effect of degrading the PMMA (island) phase; the UV by itself does not appear to do this to a substantial degree to the PMMA. The effect of UV is primarily to cross-link the PS phase. However ozone will have the opposite effect of breaking down both polymer phases. It is thought that this why the, in the long dosage limit, the entire film is broken down and able to be washed away by the acetic acid.

These results highlight the need in these experiments to perform the UV irradiation in an oxygenic atmosphere such as air. It is expected that an increased oxygen content has the effect of accelerating the overall process, reducing the minimum critical UV dosage and shortening the time scale over which the portion effect can be obtained.

It is considered that other gaseous environments can have the same accelerating effect as the UV transformed oxygen (to ozone). This could include a sulphurous environment ($S_2$ to $S_3$) though this is unlikely to be a process that is most preferred in industry (for safety reasons). However the principal role of ozone in these experiments is as a powerful, gaseous oxidizing agent. The gaseous nature is considered to be important in allowing the agent to diffuse into the solid polymer phase. There are other such agents that could be injected into the atmosphere during UV irradiation that will have a similar effect, such as chlorine and/or fluorine.

Figure 30:
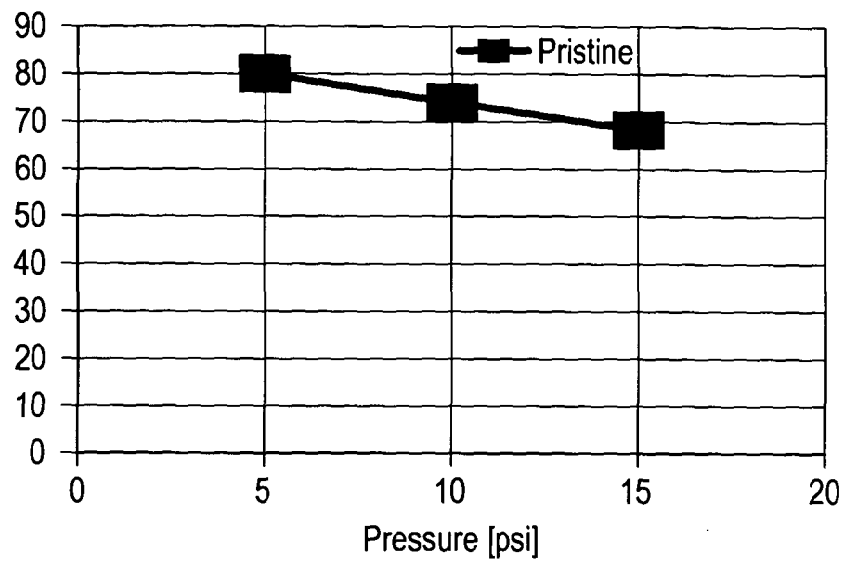
FIG. 30 shows the filtration efficiency of a filter substrate used for comparison.
Figure 31:
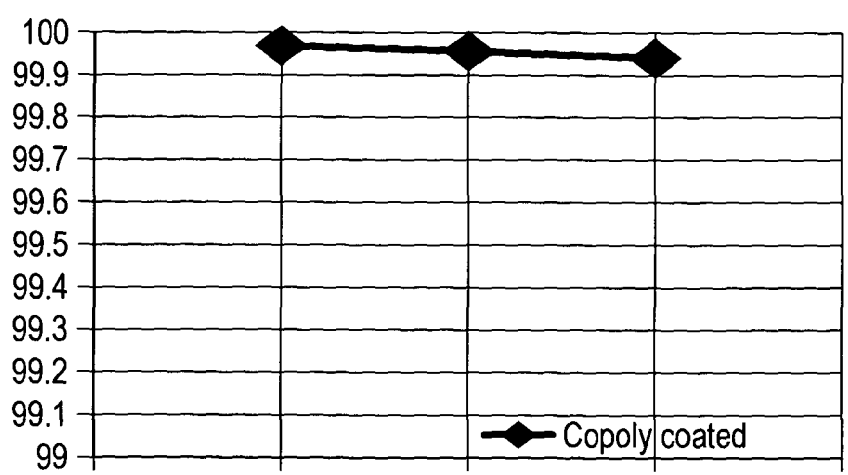
FIG. 31 shows the filtration efficiency of a filter medium according to an embodiment of the invention.

A conventional filtration membrane was used in a dead-end filtration system to separate a suspension of malachite green dye (500 ppm). The filtration efficiency of this conventional membrane is shown in FIG. 30. An identical conventional filtration membrane was infiltrated with a spherical block copolymer system according to an embodiment of the invention and subsequently treated with UV and washed with acetic acid. The resulting membrane was used in an identical dead-end filtration system to separate a suspension of malachite green dye. The results are shown in FIG. 31. The result of adding the copolymer-based nanoporous filtration material was to increase the filtration efficiency from 80% for the pristine untreated membrane to 99.98% for the treated membrane. The overall flux of water through the system was not significantly diminished.

Figure 32:
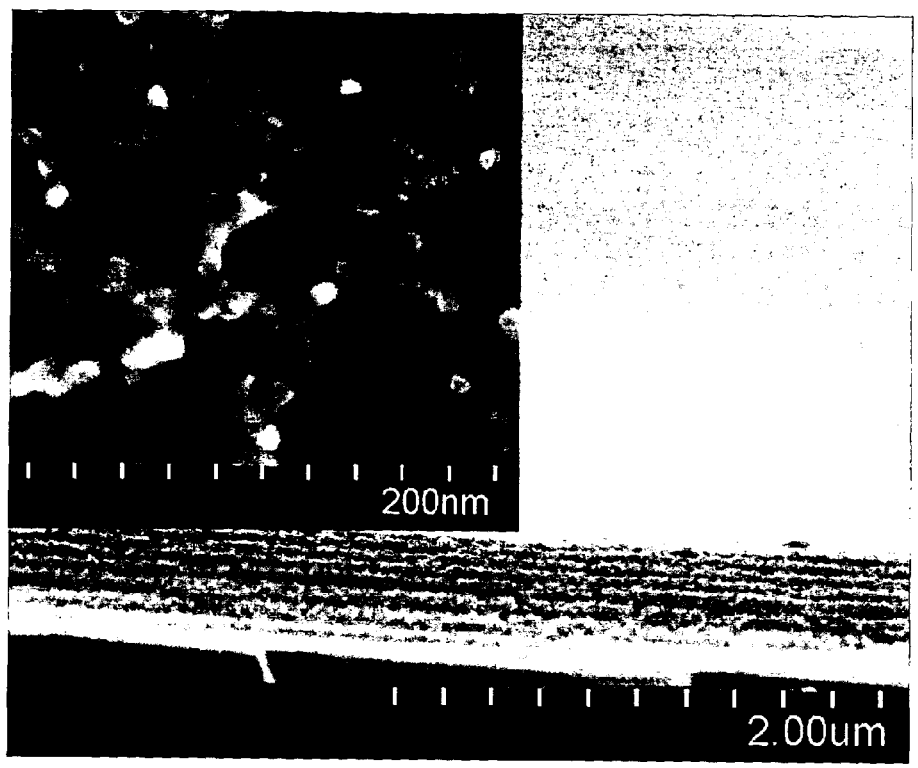
FIGS. 32-34 show SEM micrographs of various nanoporous media according to embodiments of the invention.
Figure 33:
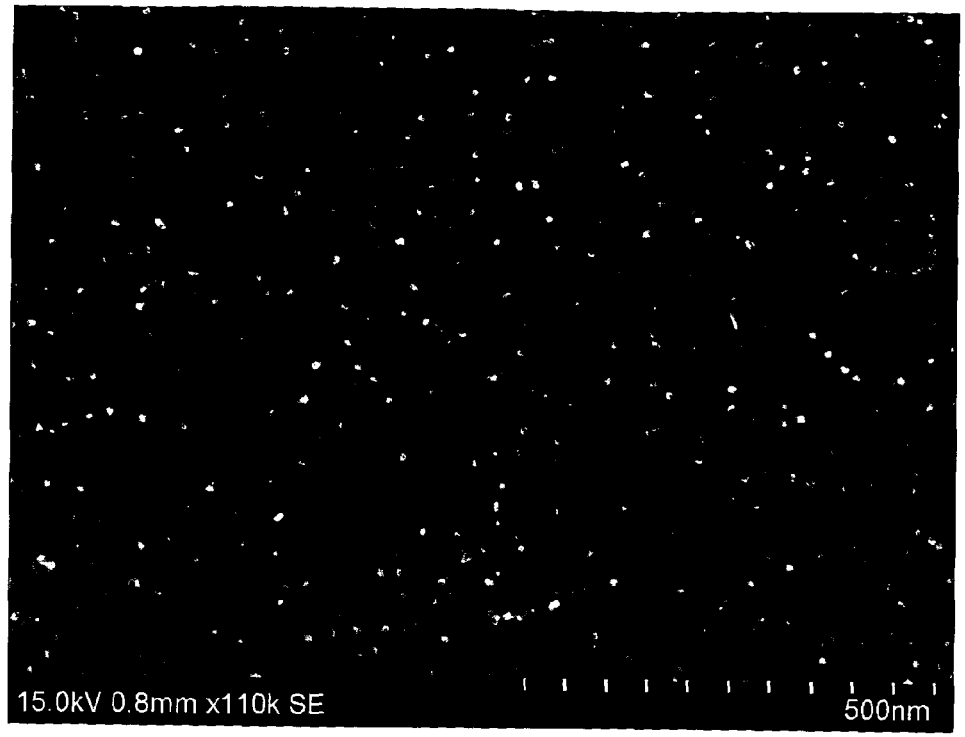
Figure 34:
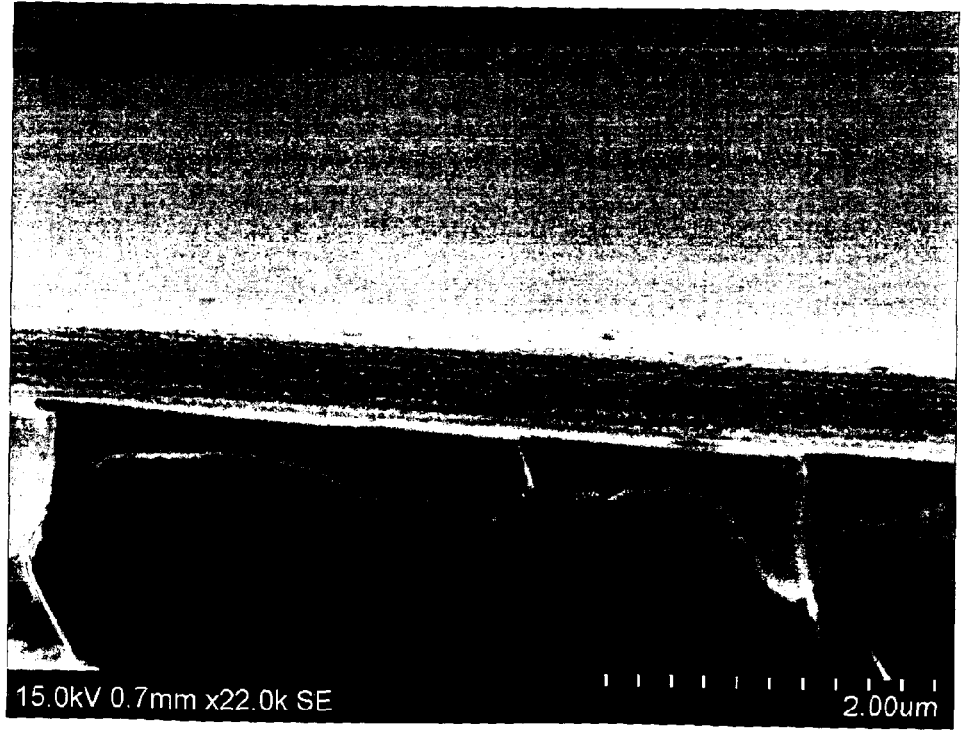

A nanoporous material according to an embodiment of the invention was infiltrated with an inorganic oxide precursor (a precursor for titanium oxide in this example). The PS matrix was then removed by thermal treatment. The result is that the nanoporous PS material is replaced with an inorganic porous structure of titanium oxide. FIG. 32 shows a cross sectional view of the resultant structure with an inset showing a highly magnified view of the surface of the structure. Note that this film, nearly 0.5 microns thick, is nearly transparent. Similarly, FIG. 33 shows a plan view of a resultant structure. FIG. 34 shows a cross sectional view of the sample of FIG. 33. Such membranes of nanoporous titanium oxide are important materials for use in organic solar cells.

In another example, it is possible to use the nanoporous PS material to prepare nanoporous gold films by the electroplating technique. This has been used previously to grow cobalt nanostructures in the cylindrical voids left from UV-treated PS-b-PMMA films. A similar methodology is applied here. After electroplating the residual material was been removed by an oxygen plasma etch and observed with SEM. One important fact about the electrodeposition method is that it is only possible if there is a continuous path through the nanoporous template to the electrode. Therefore the development of these gold structures provides evidence that there is not a cross-linked PS wetting layer nearest the substrate surface. The lack of any such barrier layer is potentially very important if these nanoporous templates are used subsequently for a number of applications including electrodes for photovoltaics and solar and fuel cells as well as in filtration media.

It is possible to draw some conclusions from this work, as follows.

Starting from a pure diblock copolymer structure, A-B where $F_A$ is preferably between 8 and 20%, and where component B can be cross-linked whilst component A is degraded and removed, it is possible to produce a nanoporous structure which retains a bicontinous 3-D architecture. It is considered an important preferred feature here that the A-B block copolymer should have a morphology consistent with a spherical micellar architecture prior to treatment. This can also be applied to an A-B-C triblock copolymer system where A is still the component that is degraded.

Starting from a pure block copolymer, A-B where $F_A$ for the pure state is preferably between 8 and 30%, but by the addition of a homopolymer of B it is possible to reduce the overall value of FA of the mixture to a value preferably between 8 and 20%, it is possible to produce a nanoporous structure which retains a bicontinous 3-D architecture. It is preferred that the molecular weight of the B homopolymer is no larger then the molecular weight of the B portion of the copolymer. It is further preferred that the molecular weight of the B homopolymer is no smaller than one fifth of the molecular weight of the B portion of the copolymer. This can also be applied to an A-B-C triblock copolymer system where A is still the component that is degraded.

The resultant, preferred structures of the embodiments of the invention are characteristic. They are identified as comprising parallel lamellar sheets that are individually perforated with holes that are separated from each other by a distance comparable to (e.g. within a factor of 5 or less of) the initial period of the spheres. The thickness of the lamellar sheets is also comparable to this value. The lamellar sheets are separated by a distance that is typically also comparable to this value. These dimensions can be reduced by subsequent physico-chemical soaking in other solvents.

In the specific case of a PS-PMMA block copolymer system, crosslinking and degradation is carried out by UV exposure. It is then developed by the use of acetic acid. This is found to be the best developing solution although formic acid may have similar but diminished effects. Typically, there is a minimum time for the UV exposure step, beyond which it is possible to develop the preferred nanoporous structures. This critical time will depend on the distance from substrate to UV source, dosage time and UV source power (and material thickness for very thick samples). Also this critical time increases with the overall size of the block copolymer. It is considered that a gaseous oxidising agent such as ozone may have a critical role to play in the full development of the porous morphology, such ozone being conveniently generated by the interaction of UV radiation with oxygen in the atmosphere surrounding the material.

The nanoporous holes in the lamellar sheets are typically of sizes from about 10 nm upwards in a manner that increases with the size of the initial A component of the untreated block copolymer. The spacing between the holes increases from values of typically about 20 nm upwards and increasing with the overall size of the block copolymer.

Once formed, it is possible to chemically treat the resulting nanoporous structures to alter the porous dimension of the materials. This is considered to be a result of a partial collapse of the remaining crosslinked polymer in the presence of the antipathic solvent. Equally it is possible to expand the polymer to a more open structure by the use of a favourable solvent such as cyclohexane. The changes in dimension possible are, for example, up to a factor of about 2.

It is also possible to manufacture supercapacitor electrodes (or fuel cell electrodes) using preferred embodiments of the present invention. A recent review of supercapacitors (also called electrochemical capacitors) is set out by Simon and Gogotsi [P. Siman and Y Gogotsi "Materials for Electrochemical Capacitors" Nature Materials Vol. 7 Nov. 2008 p. 845], the content of this review paper being incorporated herein by reference in its entirety. Therefore, the background, typical structure and principles of operation of supercapacitors will not be set out here, since it will be known to the skilled person.

A nanoporous polymeric material template is first formed. This can be done using block copolymer techniques as described above. Alternatively, a gyroid block polymer structure can be used. One component of the block copolymer is then removed in order to create a template having interconnected porosity. The template is then backfilled with a second material. This is a supercapacitor dielectric material, or a precursor thereof.

The backfilled template is then subjected to a heat treatment in the range 300-500° C. in a controlled non-oxidative environment. This has the effect of (at least partially) sintering the supercapacitor dielectric material and pyrolysing the matrix polymer. The pyrolysis leaves an interconnected carbon skeleton bicontinuous with the supercapacitor dielectric material. The resultant structure has a pseudo-capacitance enhancement effect to the double-layer capacitance.

The supercapacitor dielectric material is $RuO_2$, $IrO_2$, NiO, $CoO_x$ and $MnO_2$. Of these, most preferred is $MnO_2$.

The preferred embodiments of the invention have been described by way of example. Modifications of these embodiments, further embodiments and modifications thereof will be apparent to the skilled person on reading this disclosure and as such are within the scope of the present invention.

The invention claimed is:

1. A method of manufacturing a nanoporous material comprising:
    forming a morphology comprising a three dimensional array of isolated islands in a continuous matrix, wherein the islands are formed of at least one island component of a block copolymer and the matrix is formed of at least one matrix component of the block copolymer;
    causing a solvent to diffuse through the matrix, the island component having a preferential solubility in the solvent and thereby increasing osmotic pressure in the islands;
    forming channels in the matrix between at least some of the islands due to the increasing osmotic pressure in the islands; and
    selectively removing the island component to leave the matrix with an array of interconnected pores.

2. The method according to claim 1 wherein the islands are substantially equi-axed.

3. The method according to claim 1 wherein the islands have an average diameter of between 5 nm and 100 nm.

4. The method according to claim 1 wherein the three dimensional array of islands is a substantially ordered array.

5. The method according to claim 4 wherein there is a regular minimum spacing between adjacent islands, and where the average diameter of the islands is d, the regular minimum spacing between adjacent islands is at least 1.5 d.

6. The method according to claim 1 wherein the number fraction of monomer units in the island component of the block copolymer is between 1-20%.

7. The method according to claim 6 wherein the number fraction of monomer units in the island component of the block copolymer is at least 5-8%.

8. The method according to claim 1 wherein the composition used to form the three dimensional array of isolated islands in a continuous matrix comprises one or more homopolymers added to a diblock copolymer.

9. The method according to claim 8 wherein the homopolymer additive is formed from the same monomer units as is used for the matrix component of the morphology or is a material that is miscible in the matrix component.

10. The method according to claim 8 wherein the homopolymer additive is formed from the same monomer units as is used for the island component of the morphology or is a material that is miscible in the island component.

11. The method according to claim 8 wherein the sum of the number fraction of monomer units of homopolymer for integration with the matrix and the number fraction of monomer units of matrix component is 1-99%.

12. The method according to claim 8 wherein the sum of the number fraction of monomer units of homopolymer for integration with the islands and the number fraction of monomer units of island component is 1-20%.

13. The method according to claim 1 wherein the island morphology is developed by thermal treatment.

14. The method according to claim 1 wherein the matrix is treated by cross-linking.

15. The method according to claim 14 wherein the islands degrade in response to the cross-linking treatment applied to the matrix.

16. The method according to claim 15 wherein the degraded islands are removed using a washing fluid.

17. The method according to claim 16 wherein the matrix component comprises polystyrene, the island component comprises PMMA and the washing fluid comprises acetic acid.

18. The method according to claim 14 wherein the material is subjected to a gaseous oxidising agent during the cross-linking of the matrix.

19. The method according to claim 18 further comprising:
    using UV radiation to cross link the matrix; and
    wherein the gaseous oxidising agent is ozone formed due to interaction of oxygen gas with the UV radiation used to cross link the matrix.

20. The method according to claim 18 wherein the gaseous oxidising agent is selected from ozone, sulphur, chlorine and fluorine.

21. The method according to claim 1 wherein the nanoporous material has a plurality of lamellae, each lamella having an array of pores penetrating therethrough, adjacent lamellae being spaced apart by an intervening spacing layer wherein the spacing layer comprises an array of spacing elements integrally formed with and extending between the adjacent lamellae, the spacing layer having interconnected porosity extending within the spacing layer.

* * * * *